United States Patent
Matsumoto et al.

(10) Patent No.: US 7,079,672 B2
(45) Date of Patent: Jul. 18, 2006

(54) FINGERPRINT IMAGE EVALUATING METHOD AND FINGERPRINT MATCHING DEVICE

(75) Inventors: Noriyuki Matsumoto, Nagoya (JP); Hideyo Takeuchi, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 620 days.

(21) Appl. No.: 09/937,623

(22) PCT Filed: Jan. 26, 2001

(86) PCT No.: PCT/JP01/00571

§ 371 (c)(1),
(2), (4) Date: Dec. 28, 2001

(87) PCT Pub. No.: WO01/55966

PCT Pub. Date: Aug. 2, 2001

(65) Prior Publication Data

US 2002/0181749 A1    Dec. 5, 2002

(30) Foreign Application Priority Data

Jan. 28, 2000    (JP)    ............................... 2000-20019

(51) Int. Cl.
*G06K 9/00*    (2006.01)
(52) U.S. Cl. ........................ 382/125; 356/71; 340/5.83
(58) Field of Classification Search ................ 382/100, 382/124, 125, 126; 283/68; 356/71; 340/5.82, 340/5.83
See application file for complete search history.

(56) References Cited

U.S. PATENT DOCUMENTS

| | | | | |
|---|---|---|---|---|
| 4,156,230 A | * | 5/1979 | Riganati et al. | ............ 382/124 |
| 5,040,224 A | * | 8/1991 | Hara | .......................... 382/124 |
| 5,426,708 A | * | 6/1995 | Hamada et al. | ............. 382/125 |

FOREIGN PATENT DOCUMENTS

| | | |
|---|---|---|
| JP | A 5-225345 | 9/1993 |
| JP | A 7-121712 | 5/1995 |
| JP | A 8-110949 | 4/1996 |
| JP | A 8-115425 | 5/1996 |
| JP | A 8-129644 | 5/1996 |
| JP | A 8-263658 | 10/1996 |
| JP | A 9-274656 | 10/1997 |
| JP | A 9-297844 | 11/1997 |

* cited by examiner

*Primary Examiner*—Jingge Wu
*Assistant Examiner*—Anand Bhatnagar
(74) *Attorney, Agent, or Firm*—Oliff & Berridge, PLC

(57) ABSTRACT

The present invention determines whether fingerprint ridge-line information is contained within the fingerprint image using a simple method by considering the properties of the fingerprint ridgeline. In this fingerprint image evaluation method, a density is obtained of a reference point provided within the fingerprint image and a density is obtained of a comparison point that is shifted from the reference point by a predetermined distance. The amount of fingerprint ridge-line information contained within the fingerprint image is evaluated based upon a difference between the density of the reference point and the density of the comparison point. In this fingerprint image evaluation method, the characteristic of the fingerprint ridgeline, in which a fingerprint furrow line exists proximally to the fingerprint ridgeline, is utilized. Therefore, erroneous determinations can be prevented in which an image, which is not in fact a fingerprint image, is determined to be a fingerprint image. In addition, it is only required to obtain the density of the reference point and the density of the comparison point, and to calculated their difference. Therefore, time consuming processing is not necessary, such as is required to extract characteristic points from a fingerprint image.

18 Claims, 25 Drawing Sheets

(a)

(b)

(a)

(b)

(c)

(d)

(e)

(f)

(g)

(h)

(i)

(a)

(b)

(c)

(d)

(e)

(a)

(b)

(a)

(b)

(c)

(a) GDS pattern of i-th line (b) GDS pattern of i+1-th line (a)

(b)

① clear fingerprint image

② finger print image buried in noise (a) fingerprint GDS  (b) fingerprint pitch fingerprint waveform of i-th line (collected from fingerprint image mentioned above)

fingerprint GDS and pitch

FINGERPRINT IMAGE EVALUATING METHOD AND FINGERPRINT MATCHING DEVICE

FIELD OF THE INVENTION

The present invention relates to fingerprint verification technology for registering fingerprint images and more particularly, to evaluation technology for evaluating the quality of fingerprint images.

BACKGROUND ART

Generally, a fingerprint verification device is used to compare a fingerprint image, which has been collected from a person to be identified, with a registered fingerprint image in order to determine whether the person to be identified is in the register. In such types of fingerprint verification devices, the fingerprint image collected from the person to be identified may be of poor quality, such as an image containing inadequate fingerprint ridgeline information caused by a dry or wet finger. In such case, sufficient information about the individual cannot be extracted in order to differentiate the person to be identified from the registered fingerprint images, thereby resulting in erroneous verification. Consequently, it has become an important issue to improve verification precision by using only good quality fingerprint images (i.e., fingerprint images having sufficient fingerprint ridgeline information and fingerprint images having little noise). In order to solve this problem, it is essential to evaluate the quality of the fingerprint image; thus, several technologies for evaluating the quality of fingerprint images have been previously developed.

In one of these technologies, the dark and light portions of the fingerprint image are represented by binary numbers, and the area of the dark portion (or light portion) of a predetermined area within the binary image is obtained. The quality of the fingerprint image is evaluated based upon the ratio of the dark area to the light area (e.g., Japanese Laid-open Patent Publication No. 8-110949). In another method, the number of characteristic points (endpoints or bifurcation points of the fingerprint ridgelines) of the fingerprint image is obtained. The quality of the fingerprint image is evaluated based upon the number of obtained characteristic points (e.g., Japanese Laid-open Patent Publication No. 8-129644).

However, the method for evaluating the quality of the fingerprint image using the ratio of dark and light portions makes the determination of the quality of the fingerprint image based solely upon the ratio of dark and light portions of the fingerprint image. Fingerprint ridgelines are not taken into consideration. Consequently, images containing insufficient data representing the fingerprint ridgelines (i.e., images having warped or collapsed fingerprint ridgelines) are sometimes determined to be good quality images. On the other hand, the technology for determining the quality of the fingerprint image by using characteristic points requires a long time to extract the characteristic points from the fingerprint image. Therefore, it is not easy to determine the quality of the fingerprint images.

Accordingly, it is an object of the present invention to provide fingerprint image evaluation methods and fingerprint verification devices capable of evaluating the quality of fingerprint images using a simple process that utilizes the characteristics of fingerprint ridgelines.

SUMMARY OF THE INVENTION

In one aspect of the present invention, the density of a point on a fingerprint ridgeline of a fingerprint image and the density of another point on a fingerprint furrow line, which point is separated by a predetermined distance from the point on the fingerprint ridgeline, are determined; then, the amount of fingerprint ridgeline information contained within the fingerprint image is evaluated based upon the difference between the two determined densities. According to the present specification, the meaning of "density" is not limited to the particular density at each point on the fingerprint image, but can also mean any physical quantity that can be converted into a density; thus, it is not important whether the physical unit has been converted into a density. Therefore, for example, the voltage of the image signal before it is converted into a "density" would be acceptable. In addition, the meaning of "based upon the difference between the densities" is not limited to the density difference that is calculated by subtracting one actually recorded density from another density, and includes, for example, a determination based upon parameters for which the magnitude of the difference between the densities can be determined. Therefore, for example, if a ratio of the densities is obtained, the size of the difference in densities, which is determined by the calculated ratio, also would be included within the meaning of "based upon the difference between the densities."

According to this aspect, only the density of a point on the fingerprint ridgeline and the density of a point on the fingerprint furrow line, which is separated by a predetermined distance from the point on the fingerprint ridgeline, are obtained; therefore, time consuming processing is not required, such as extracting the characteristic points from the fingerprint image. In addition, the amount of fingerprint ridgeline information contained within the fingerprint image is evaluated by considering the characteristics of a clear fingerprint image (i.e., because a fingerprint furrow exists in a position separated from the fingerprint ridgeline by a predetermined distance, there is large difference between the density of the fingerprint furrow line and the density of the fingerprint ridgeline); therefore, erroneous determinations can be prevented, such as mistakenly determining that an image, which is not in fact a fingerprint image, is a fingerprint image.

If the fingerprint image is clear as shown in FIG. 6(a) (i.e., if a large amount of fingerprint ridgeline information exists), the fingerprint ridgeline and the fingerprint furrow line can be clearly distinguished; therefore, the difference between the density of a point on the fingerprint ridgeline and the density of a point on the neighboring fingerprint furrow line is large, as shown in FIG. 6(b). FIG. 6(b) shows the density along a horizontal line drawn across the fingerprint image shown in FIG. 6(a).

On the other hand, if the fingerprint image is obscured as shown in FIG. 7(a) (i.e., if very little finger print ridgeline information exists), the fingerprint ridgeline and the fingerprint furrow line cannot be clearly distinguished and the difference between the density of a point on the fingerprint ridgeline and the density of a point on the neighboring fingerprint furrow line is small, as shown in FIG. 7(b). FIG. 7(b) shows the density along a horizontal line drawn across the fingerprint image shown in FIG. 7(a).

Therefore, it can be determined whether the fingerprint image is clear or not (i.e., whether a large amount of fingerprint ridgeline information exists or not) by comparing the density of a point on the fingerprint ridgeline and the density of a point of the fingerprint furrow line in the neighborhood of the point on the fingerprint ridgeline.

The point on the fingerprint ridgeline, which is used to determine the quality of the fingerprint image, can be selected from any suitable points within the collected fingerprint image. For example, when the fingerprint image is collected using a total reflection type (optical type) device, the point on the fingerprint ridgeline will appear dark; therefore, a point that has a density greater than a predetermined value can be selected as the point on the fingerprint ridgeline. In addition, the point on the fingerprint furrow line may be selected from a suitable point within the fingerprint furrow line, which point is separated from the point on the fingerprint ridgeline by a predetermined distance, after the point on the fingerprint ridgeline has been determined. For example, if the fingerprint is collected using a total reflection type device, the point on the fingerprint furrow line will appear light; therefore, a point on the fingerprint furrow line can be selected as a point where the density becomes the lowest at a position separated from the point on the fingerprint ridgeline by a predetermined distance.

In one aspect of a method for evaluating the fingerprint image based upon the above mentioned difference in densities, the density at a reference point provided within the fingerprint image, and the density at a comparison point that is separated by a predetermined distance from said reference point are obtained; then the amount of fingerprint ridgeline information contained within the fingerprint image is evaluated based upon the difference between the density obtained at a reference point and the density obtained at a comparison point. The "reference point" may be appropriately selected within the fingerprint image, and the position and the number of reference points also may be appropriately selected. Further, the "comparison point" may be suitably selected for each reference point in a position that is separated by a predetermined distance, in view of the space between the reference point and the fingerprint ridgeline, and the number of comparison points, which correspond to the respective reference points, and their positions can be appropriately selected.

According to this aspect, the comparison point is selected at a position that is separated by a predetermined distance from the reference point, which is suitably selected within the fingerprint image. Then, the fingerprint image is evaluated based upon the difference of densities between the comparison point and the reference point. Because the widths of the fingerprint ridgelines are approximately constant for all persons, if a reference point is a point on the fingerprint ridgeline, a fingerprint furrow line will exist at a position that is separated from the reference point by a predetermined distance. On the other hand, if the reference point is provided on a fingerprint furrow line, a fingerprint ridgeline will exist at a position that is separated from the reference point by a predetermined distance. Therefore, by suitably setting the comparison point in a position that is separated from the reference point by a predetermined distance, when the reference point is a point on the fingerprint ridgeline, the comparison point can be selected as a point on the fingerprint furrow line. Also, when the reference point is a point on the fingerprint furrow line, the comparison point can be selected as a point on the fingerprint ridgeline. Therefore, in this method, by pre-setting the reference points and the comparison points, one of the two points can be chosen as a point on the fingerprint ridgeline, and the other point can be chosen as the point on the fingerprint furrow line; in that case, the fingerprint image can be evaluated based upon the difference of densities between the reference point and the comparison point.

In another aspect of the invention, a plurality of reference points may be utilized in the fingerprint image, and for each reference point, a corresponding comparison point may be selected. The evaluation value preferably may be calculated based upon the difference between the density for each reference point and the density at its corresponding comparison point; further, the amount of fingerprint ridgeline information contained within the fingerprint image is evaluated based upon the evaluation values calculated for each reference point.

According to this aspect, a plurality of reference points is provided within the fingerprint image, and an evaluation value (i.e., the amount of fingerprint ridgeline information) is determined for each reference point. Therefore, the fingerprint image can be evaluated based upon the amount of fingerprint ridgeline information contained in the overall fingerprint image. If a plurality of reference points is provided, the reference points may be preferably selected to extend continuously in one direction so as to form a straight line crossing the fingerprint image. If a straight line crosses the fingerprint image, the line will intersect several fingerprint ridgelines (fingerprint furrow lines) at a high rate of repetition.

In addition, a plurality of comparison points may be provided for each reference point. Preferably, the evaluation value of each reference point is calculated by obtaining the difference between the density of the reference point and the respective densities of the corresponding comparison points provided for each reference point.

According to this construction, the fingerprint ridgeline information can be precisely evaluated at the reference point. Because the fingerprint ridgeline has a direction, it is possible for both the reference point and the comparison point to be provided on either the fingerprint ridgeline or on the fingerprint furrow line, depending on the position of the comparison point. This situation can be avoided by utilizing a plurality of comparison points. If a plurality of comparison points is selected, the directions of the comparison points, with reference to the reference point, are preferably not the same (including opposing directions).

In another aspect of the fingerprint image evaluation method of the present invention, the fingerprint image is evaluated by utilizing the variation of the density (density fluctuation), which is shown in FIG. 6($b$), for a clear fingerprint image.

As described above, the variation of the density along a line provided within a fingerprint image (refer to FIGS. 6($b$) and 7($b$)) will characterize a clear fingerprint image, because a large difference exists between the density of the fingerprint ridgeline and the density of the fingerprint furrow line. Therefore, if the density variation along a line provided within a clear fingerprint image is considered to be a waveform signal, it will be characterized as regularly oscillating waveform, in which the amplitude of the oscillation increases.

In a fingerprint image evaluation method of the present invention that utilizes this characteristic, the density of each point on the reference line provided within the fingerprint image is determined. The density of each point is regarded as a waveform extending in the direction of the reference line; thus, the characteristics of the oscillating waveform signal are determined. The amount of fingerprint ridgeline information contained within the fingerprint image is evaluated based upon the oscillation characteristics of the waveform signal. The "reference line" may be appropriately selected within an area that contains the fingerprint ridgeline information (fingerprint portion) of the fingerprint image. If the reference line traverses the fingerprint part, the reference line and the fingerprint ridgeline (fingerprint furrow line) will intersect each other, thereby permitting proper evaluation of the amount of fingerprint ridgeline information.

According to this aspect, the amount of fingerprint ridgeline information contained within the fingerprint image can be evaluated by considering the fingerprint ridgeline characteristics, without the need to perform time consuming processes, such as calculating characteristic points.

In one aspect of the evaluation method utilizing the above mentioned oscillation characteristic, the oscillation characteristic is preferably represented by a spectrum obtained by converting the frequency of said waveform signal into a time series signal. "Frequency conversion processes" include any known frequency conversion process, such as a Fourier transform, that converts frequency domain data into time series data. Such processes may include, e.g., a process for obtaining a FFT spectrum, a process for obtaining a DFT spectrum, a process for obtaining a LPC spectrum, and a process for obtaining a group delay spectrum (hereafter called "GDS"). In addition, a process to obtain a cepstrum by performing Fourier conversion of a logarithmic spectrum obtained by frequency conversion, assuming it to be a waveform signal, also may be considered to be a "frequency conversion process." Preferably, when the process for obtaining a GDS is performed as a "frequency conversion process," the peak of the spectrum can be sharpened to show the spectrum properties more clearly.

When the spectrum properties are obtained using the frequency conversion process for the waveform signal in this manner, the oscillation characteristic of the waveform signal becomes clearer, thereby enabling proper evaluation of the amount of fingerprint ridgeline information contained within the fingerprint image.

When the fingerprint image is evaluated using the spectrum property, the amount of fingerprint ridgeline information contained within the fingerprint image can be evaluated based upon the ratio of the intensity of low frequency components to high frequency components within the obtained spectrum.

In a clear fingerprint image, the waveform signal oscillates in short periods that correspond to the pitch of the fingerprint ridgeline, and the waveform amplitude is large. Therefore, it shows a characteristic in which the amplitude of high frequency components (AC component) becomes larger than the amplitude of low frequency components (DC component), and the quality of the fingerprint image is evaluated based upon this characteristic.

In addition, when the fingerprint image is evaluated using the spectrum properties, the amount of fingerprint ridgeline information also can be evaluated by the size of the spectrum peak of the obtained spectrum.

In a clear fingerprint image, the waveform signal oscillates in correspondence with the pitch of the fingerprint ridgeline, and the waveform amplitude is large. Therefore, the spectrum obtained from frequency conversion shows a peak at a specific frequency, and the peak of the spectrum becomes large. Therefore, the amount of fingerprint ridgeline information can be evaluated by the magnitude of the spectrum peak.

One representative method for evaluating fingerprint image based upon the magnitude (amplitude) of the spectrum peak involves evaluating the magnitude of the spectrum peak by comparing the amplitude at the peak of the spectrum to the amplitude at a neighboring frequency.

When evaluation is performed using a GDS, it is possible to use the characteristic, in which the average becomes zero when the GDS is integrated with respect to frequency, and the size of the area (i.e., the larger the area, the higher the peak of the spectrum) formed by the coordinate axis (coordinate axis showing the frequency).

In the evaluation method that uses the spectrum properties to evaluate the fingerprint image, a plurality of the above-described reference lines can be provided within the fingerprint image. The spectrum properties of each one of the plurality of reference lines are obtained. It is preferable to evaluate the amount of fingerprint ridgeline information contained within the fingerprint image based upon each spectrum characteristic obtained in this manner.

In this case, because the amount of fingerprint ridgeline information is evaluated at a plurality of reference lines within the fingerprint image, the evaluation of the fingerprint image can be performed more precisely.

In addition, it is desirable to dispose the reference lines in two directions that orthogonally intersect within the fingerprint image. The fingerprint ridgeline information of the fingerprint ridgelines extending in two directions (i.e., the fingerprint ridgeline in the vertical direction and the fingerprint ridgeline in the horizontal direction) composing the fingerprint image can be evaluated in this manner.

In another fingerprint image evaluation method of the present invention, the amount of noise contained within the fingerprint image is evaluated utilizing the continuity of the fingerprint ridgeline. If the fingerprint ridgeline is buried in noise as shown in FIG. 27, fingerprint verification precision drops because suitable fingerprint ridgeline information cannot be extracted from the fingerprint image. Therefore, it becomes necessary to evaluate the amount of noise contained within the fingerprint image in order to improve fingerprint verification precision.

Therefore, in another aspect of the fingerprint image evaluation method of the present invention, a density pattern is obtained from an area provided within the fingerprint image. This established area is shifted by a predetermined distance in a predetermined direction to form a comparison area; then, a density pattern is obtained from this comparison area. Similarity is calculated from the density patterns obtained from the established area and the comparison area, and the amount of noise contained within the fingerprint image is evaluated based upon the calculated similarity. The "established area" can be appropriately selected within the fingerprint image, and the number of established areas, positions, and sizes, etc. can be appropriately selected. The "comparison area" is an area formed by shifting the established area by a predetermined distance in a predetermined direction, and the distance and direction of the shift with respect to the established area can be appropriately selected. However, it is preferable to minimize the amount of shift when the continuity of the fingerprint ridgeline is considered.

If fingerprint image is clear, the ridgeline is continuous without interruption. Therefore, the density pattern of the established area closely resembles the density pattern of the comparison area, which was selected by shifting the established area in a predetermined direction by a predetermined distance. On the other hand, if a large noise component is contained within the fingerprint image, the similarity between the two density patterns is reduced due to the effects of the noise component. Therefore, the amount of noise contained within the fingerprint image can be evaluated by calculating the similarity of the density patterns between the established area and the comparison area.

In one aspect of this method for evaluating the fingerprint image, the established area is preferably a straight line provided within the fingerprint image, and the comparison area is a straight line, which is parallel to the first straight line. The similarity of the density pattern of each area is preferably evaluated based upon the similarity of their respective signal waveforms, in which it is assumed that the density of the points on the respective straight lines composing each area defines a continuous waveform signal along the direction of the straight line.

In this method, the similarity of the density patterns can be easily evaluated by comparing the two corresponding waveform signals.

In addition, the similarity of the corresponding waveform signals can be evaluated by evaluating the similarity of the corresponding spectrum properties that can be obtained by a frequency conversion process, in which each waveform signal is assumed to be a time series signal.

According to this embodiment, the frequency conversion process clarifies the properties of the waveform signals and therefore, similarity can be precisely calculated.

In addition, the similarity of the corresponding waveform signals can be evaluated by calculating the difference between the average pitch of the two corresponding waveform signals, which are calculated based upon the average pitch from the waveform signals. The "average pitch" is intended to mean the average oscillation period of the waveform signal, i.e., the interval between the neighboring peaks of the density pattern (fingerprint ridgeline portion).

In another aspect of the present invention, a new fingerprint verification device comprises a fingerprint image collection means that collects the fingerprint and outputs a fingerprint image; a reference point density determination means that determines the density of one or a plurality of reference points provided within the fingerprint image based upon the fingerprint image collected by said fingerprint image collection means; a comparison point density determination means that determines the density of one or a plurality of comparison points from the fingerprint image collected by said fingerprint image collection means, wherein the comparison points are provided so as to correspond to each reference point within the fingerprint image, and are separated from the corresponding reference point by a predetermined distance; a fingerprint ridgeline information evaluation means that calculates the difference between the density of each reference point obtained by said reference point density determination means and the density of the comparison point corresponding to each reference point obtained by said comparison point density determination means, and the amount of fingerprint ridgeline information contained within the fingerprint image is evaluated based upon the calculated difference; and a registered fingerprint verification means that registers and collates the fingerprint image when said fingerprint ridgeline information evaluation means determines that the fingerprint image has more than a predetermined amount of fingerprint ridgeline information. With respect to the fingerprint image collection means, any device that can collect a fingerprint from a person to be identified and can output a fingerprint image is appropriate, and the type of fingerprint collection method that is used is not important. Therefore, fingerprints can be collected using an optical method that utilizes a prism and CCD camera (i.e., a light-path separation method and a total reflection method); in the alternative, fingerprints can be collected using a non-optical method that utilizes a fingerprint reading chip (i.e., an electrostatic capacity detection method, an electric field intensity measurement method, and a heat detection method). If a fingerprint reading chip is used, the light path, which is required in the optical method, is not necessary and thus, the size of the device can be reduced.

According to this fingerprint verification device, only fingerprint images that are determined to have sufficient fingerprint ridgeline information are used to perform fingerprint registration and fingerprint verification; therefore, the fingerprint verification process can be performed more precisely.

In another aspect of the present invention, the fingerprint verification device comprises: a fingerprint image collection means that collects and outputs the fingerprint image; a reference point density determination means that determines the density of each point on one or a plurality of reference lines provided within the fingerprint image based upon the fingerprint image collected by said fingerprint image collection means; an oscillation property acquisition means that determines the oscillation property of the waveform signal, in which the density of each point on one or a plurality of reference lines provided within the fingerprint image is assumed to be a continuous waveform signal along the direction of the reference line; a fingerprint ridgeline information evaluation means that evaluates the amount of fingerprint ridgeline information contained within the fingerprint image based upon the oscillation properties determined by the oscillation property acquisition means; and a registration and verification means that registers and collates the fingerprints using the fingerprint image when said fingerprint ridgeline information evaluation means determines that the amount of fingerprint ridgeline information contained within the fingerprint image is greater than a predetermined amount.

In another aspect of the present invention, a fingerprint verification device comprises: a fingerprint image collection means that collects and outputs the fingerprint image; an established area density pattern acquisition means that obtains the density pattern of one or a plurality of established area(s) provided within the fingerprint image from the fingerprint image collected by said fingerprint image collection means; a comparison area density pattern acquisition means that calculates the density pattern for the comparison area, which is disposed in a position that is shifted by a predetermined distance from said corresponding established area within the fingerprint image, based upon the fingerprint image obtained by said fingerprint image collection means; a similarity calculation means that calculates the similarity between the two corresponding density patterns obtained by said density pattern acquisition means; a noise component evaluation means that evaluates the amount of noise contained within the fingerprint image based upon the similarity calculated by said similarity calculation means; and a means for performing fingerprint registration and fingerprint verification using the fingerprint image when said noise component evaluation means determines that the amount of noise contained within the fingerprint image is less than a predetermined amount.

In this fingerprint verification device, fingerprint registration and verification is performed only after the amount of noise contained within the fingerprint image is evaluated; therefore, fingerprint verification can be performed more precisely. In particular, if a fingerprint reading chip is utilized to collect the fingerprint image, noise tends to be included within the fingerprint image; therefore, the above-described fingerprint verification device is particularly effective.

PREFERRED EMBODIMENTS FOR PRACTICING THE INVENTION

Figure 1:
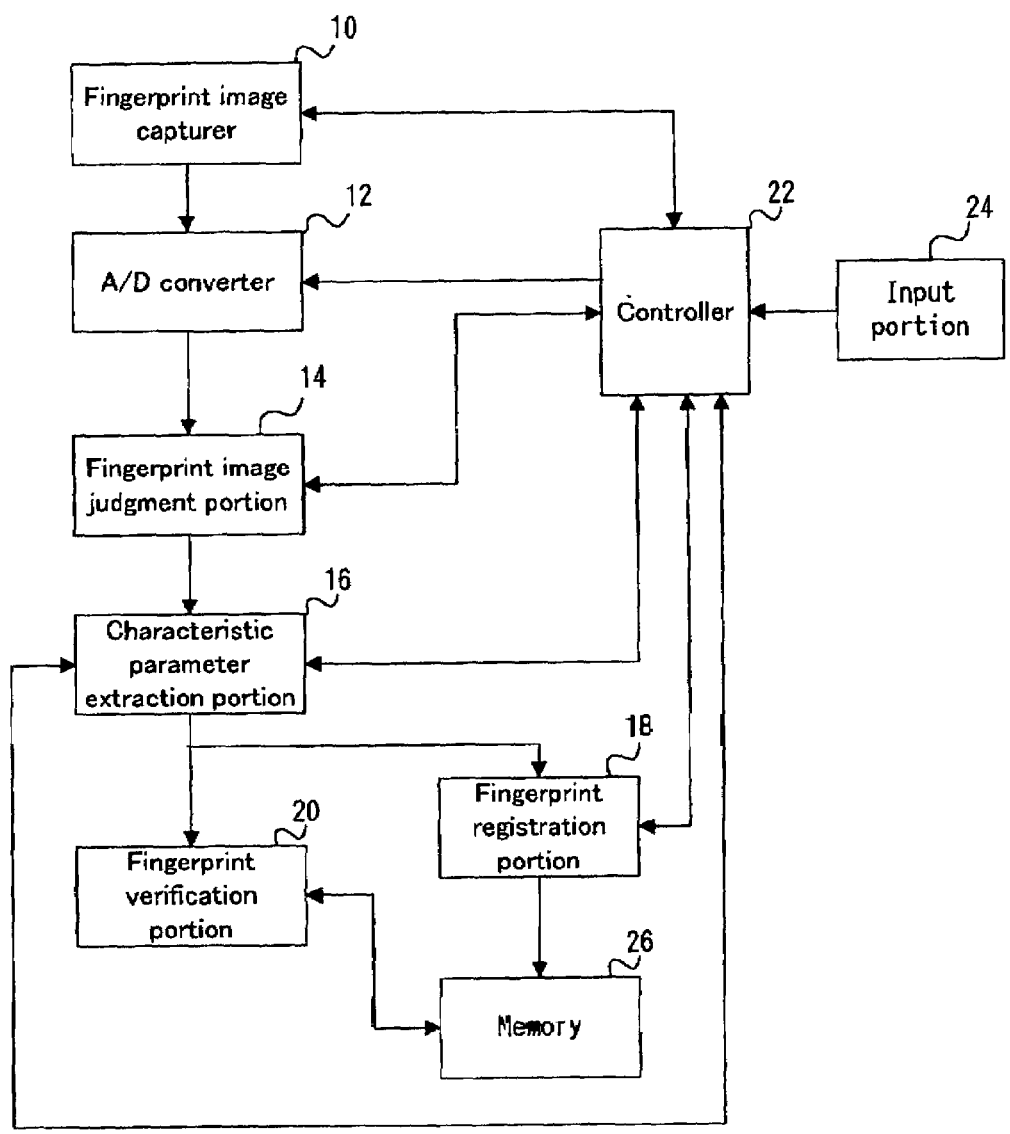
FIG. 1 is a block diagram showing the overall construction of a fingerprint verification device related to the present invention.

An embodiment of a fingerprint verification device relating to the present invention will be explained below with reference to the drawings. FIG. 1 is a block diagram showing the overall construction of the fingerprint verification device.

As shown in FIG. 1, the fingerprint verification device comprises a fingerprint image capturer 10 that records the fingerprint and outputs a video signal, an A/D converter 12 that converts the video signal into fingerprint image data, a fingerprint image judgment portion 14 that determines the effectiveness of the fingerprint image data, a characteristic parameter extraction portion 16 that extracts the characteristic information in order to identify the person based upon the effective fingerprint image data, a fingerprint registration portion 18 that registers in memory 26 the characteristic parameters extracted by the characteristic parameter extraction portion 16, a fingerprint verification portion 20 that compares the characteristic parameters of the fingerprint collected by the fingerprint image capturer 10 with the characteristic parameters stored in the memory 26, a controller 22 that controls the registration and verification operations, and an input section 24 that includes a keyboard for inputting ID codes and other data.

Figure 19:
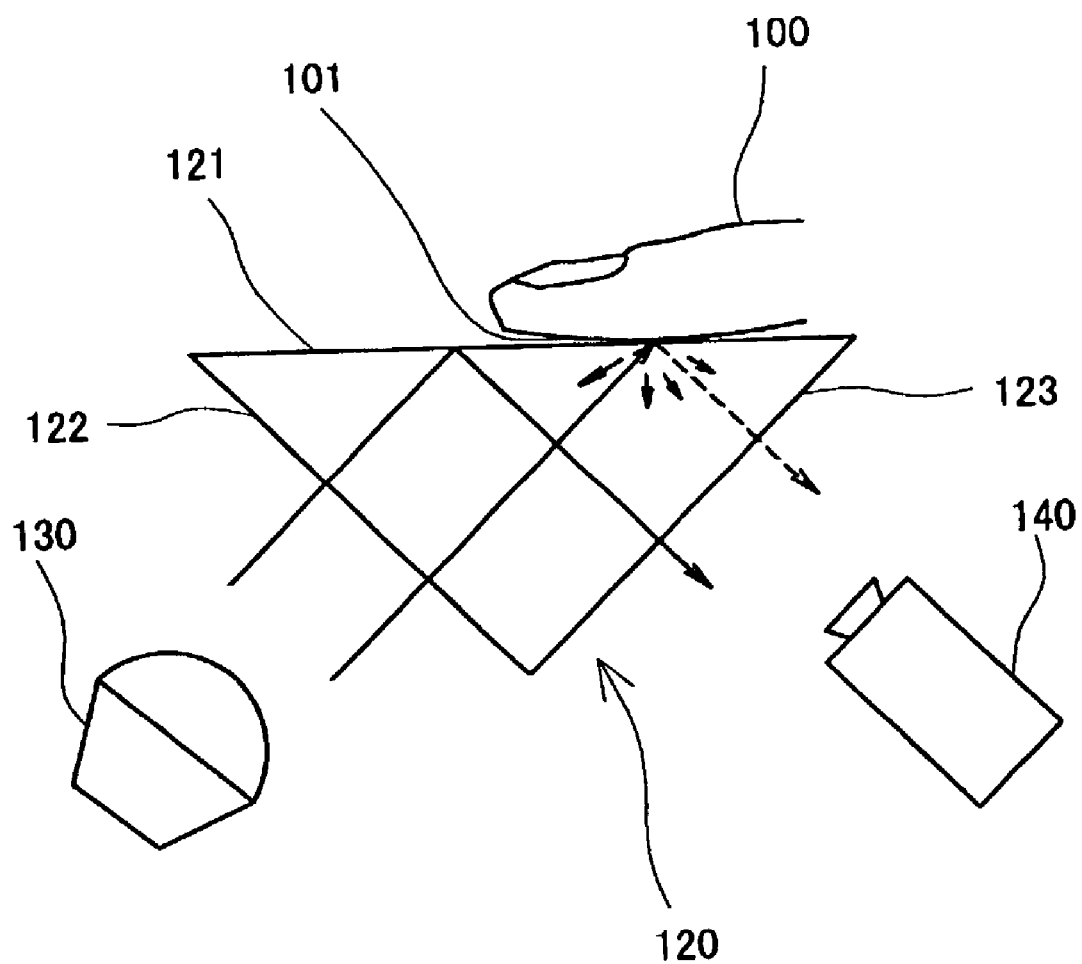
FIG. 19 shows the construction of the fingerprint image collection section.

As shown in FIG. 19, the fingerprint image capturer 10 comprises a right angle prism 120 having a prism surface 121, on to which a fingerprint surface 101 of a finger 100 is pressed; a light source 130 that illuminates the oblique surface 122 of the right angle prism 120; and a CCD element 140, which is disposed in parallel with the oblique surface 123 of the prism and receives reflected light that corresponds to the fingerprint ridgeline portion as a dark image, and receives reflected light that corresponds to the fingerprint furrow portion as a light image.

The video image (i.e., dark and light images of the fingerprint ridgeline) collected by the fingerprint image capturer 10 is transmitted at a predetermined frequency (several hundred milliseconds) via a coaxial cable to the A/D converter 12. The video signal transmitted from the fingerprint collector 10 is converted from an analog signal to a digital signal and stored in s memory as fingerprint image data (i.e., two-dimensional digital dark and light data).

The fingerprint image judgment portion 14 makes a determination as to the finger positioning in order to determine whether the finger has begun to be placed on the upper prism surface 121. It also determines image stability in order to determine whether the fingerprint image data has stabilized, and image effectiveness in order to determine whether sufficient characteristic data (i.e., fingerprint ridgeline information) is contained within the fingerprint image data The fingerprint image judgment portion 14 then classifies the fingerprint image data, which was collected by the fingerprint image capturer 10, into several categories, and outputs to the controller 22 the information that identifies to which category the fingerprint image data belongs.

A procedure for calculating the image quality determining value performed by the fingerprint image judgment portion 14 will be explained in detail as follows. "A method for determining whether the obtained fingerprint image data contains sufficient fingerprint ridgeline information (whether the fingerprint image is clear or not)," used in the fingerprint verification device can be classified according the following two methods. (I) Establish a reference point and a comparison point within the image area of the fingerprint image, and evaluate the difference in the densities between the reference point and the comparison point. (II) Establish a reference line within the image area of the fingerprint image data, frequency convert a density waveform of the reference line into spectrum data, and evaluate the spectrum data. In this embodiment, the above-described methods (I) and (II) can be alternatively used. Each of the above-described methods (I) and (II) will be explained as follows with application to a method for obtaining the image determining value.

(I) Comparing the Densities of the Reference Point and the Comparison Point

In this embodiment, the absolute value of the difference between the density of the reference point and the density of the comparison point is calculated as the image quality determining value in order to evaluate the amount (i.e., present or not) of fingerprint ridgeline information contained within the fingerprint image. As a specific procedure, a plurality of reference points is selected in the fingerprint image data, and comparison points are selected proximally to each reference point. The image quality determining value (i.e., the absolute value of the difference between the density of the reference point and the density of the comparison point) is obtained for each reference point, and the image quality determining value of the fingerprint image data is calculated based upon the image quality determining value of each reference point. The procedure for calculating the image quality determining value will be explained in detail as follows.

First, the reference point selected within the fingerprint image data will be explained as follows and with reference to FIGS. 8 and 9.

Figure 8:
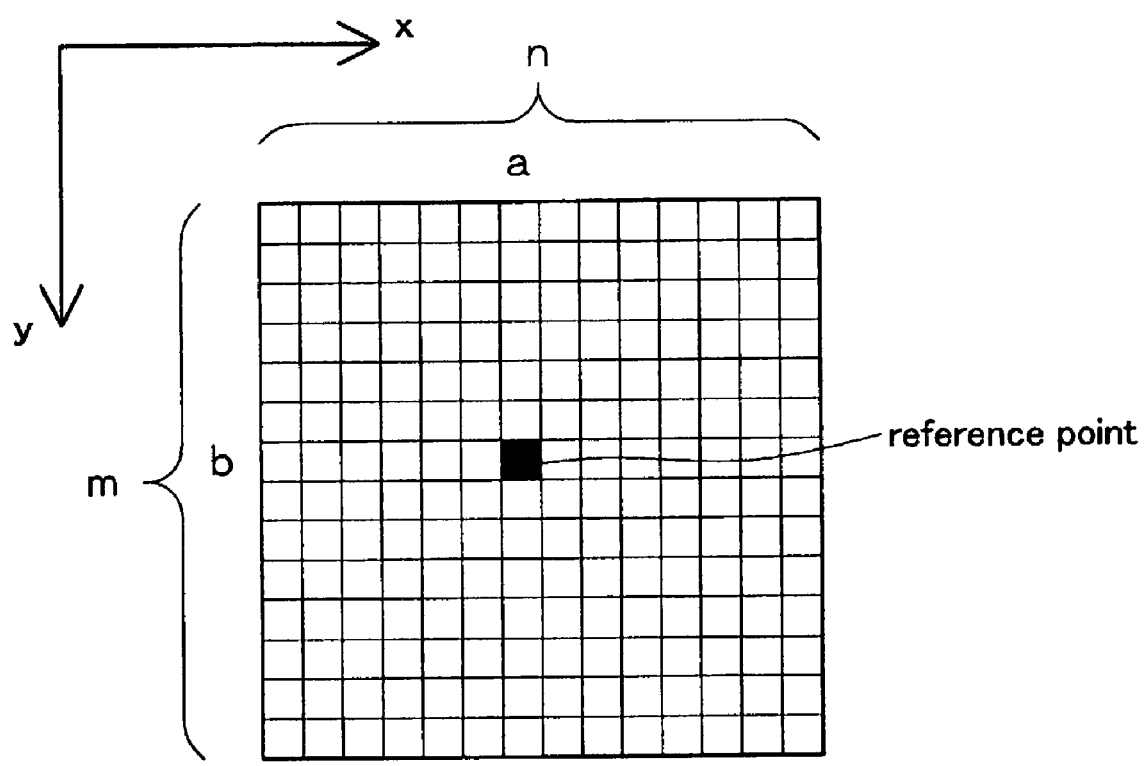
FIG. 8 shows a specific method for selecting a reference point within the fingerprint image.
Figure 9:
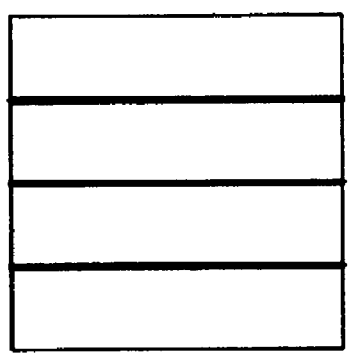
FIG. 9 shows pre-determined patterns for reference points that will be selected in the fingerprint image.
Figure 9:
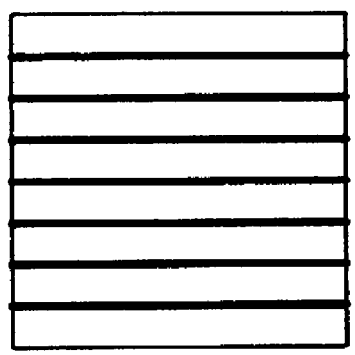
Figure 9:
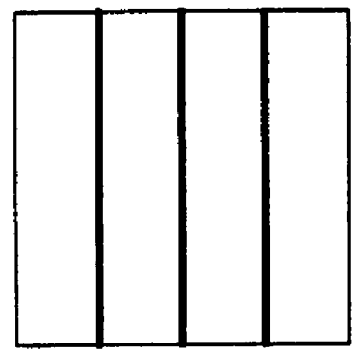
Figure 9:
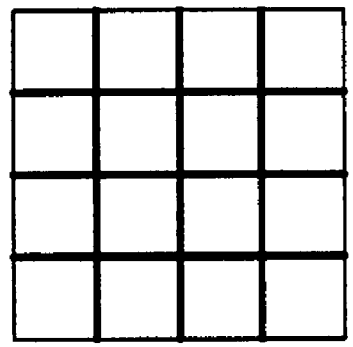
Figure 9:
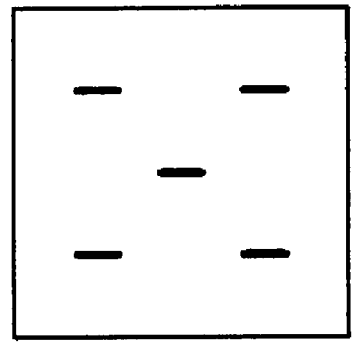
Figure 9:
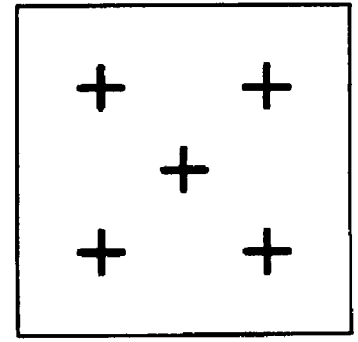
Figure 9:
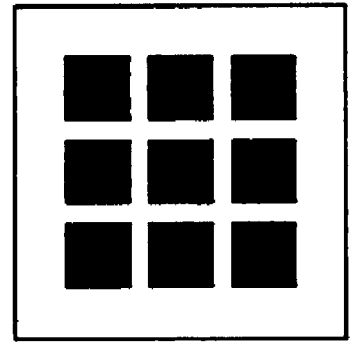
Figure 9:
Figure 9:
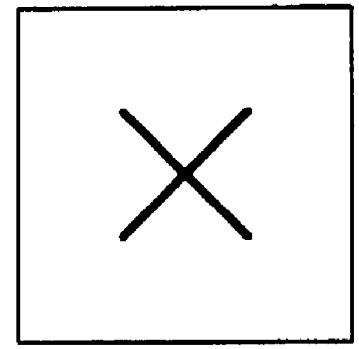

The fingerprint image data is output by the A/D converter 12 to the fingerprint image judgment portion 14 and is a two-dimensional fingerprint image data comprising n×m dots, as shown in FIG. 8. Therefore, in this embodiment, the position of the reference points in the x direction are determined by counting the number of dots in the x direction from the origin, and the position in the y direction is determined by counting the number of dots in the y direction. That is, the position of each reference point is identified by the coordinates (a, b) ($0 \leq a < n$, $0 \leq b < m$).

For example, reference points having the above described coordinates (a, b) are disposed in the fingerprint image in a predetermined pattern, as shown in FIGS. 9(a)–9(i). Representative patterns are shown as FIGS. 9(a)–9(i), in which the reference points are shown as solid, black lines provided within the fingerprint image. One of the patterns shown in FIGS. 9(a)–9(i) is selected in order to calculate the image quality determining value, based upon parameters such as processing time, judgment precision and the particular application (i.e., finger placement judgment, image stability judgment, and image effectiveness judgment).

For example, when the finger placement judgment is performed, the finger will be placed approximately in the center of the prism surface 121. Therefore, the required processing time can be shortened by selecting the pattern of FIG. 9(i), in which the reference points are only provided in the center. When the image stability judgment is performed, it is determined whether the overall fingerprint image has become stable and the judgment precision is not so important. Therefore, one of the patterns shown, e.g., in FIGS. 9(a), 9(c), 9(e), or 9(f), may be selected in order to reduce the number of reference points and shorten the required processing time. However, when the image effectiveness judgment is performed, higher precision is required than in other judgment procedures. Therefore, either one of patterns shown in FIG. 9(b) or 9(d) may be selected. When even higher judgment precision is required, either one of patterns shown in FIG. 9(g) or 9(h) may be selected.

When the pattern shown in FIG. 9(d) is selected, in which the lines cross the fingerprint image in the x and y directions, the amount of fingerprint ridgeline information can be determined that corresponds to the fingerprint ridgeline extending in the y direction contained within the fingerprint image data on the x direction line, which is formed by reference points that extend along the x direction (hereafter called "the x direction reference line"). In addition, the amount of fingerprint ridgeline information can be determined that corresponds to the fingerprint ridgeline extending in the x direction contained within the fingerprint image data on the y direction line, which is formed by reference points that extend in the y direction (hereafter called "the y direction reference line"). Therefore, when the pattern of FIG. 9(d) is selected, a determination as to the fingerprint ridgeline information extending both in x direction and the y direction can be efficiently performed.

Figure 10:
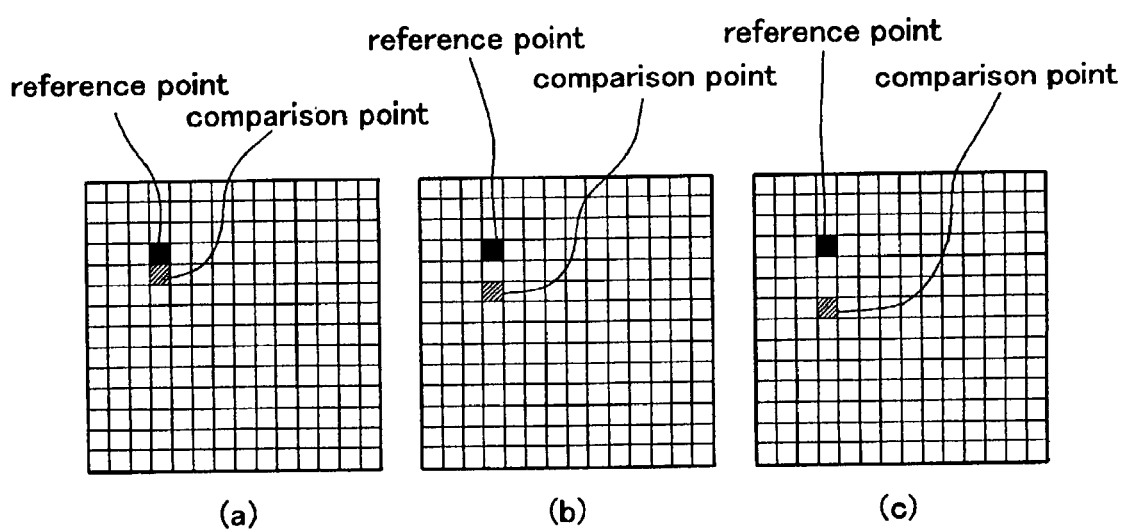
FIG. 10 shows the positional relationship between a comparison point and a reference point provided within the fingerprint image.

Next, a comparison point is selected for each reference point that was pre-determined in the above-described manner. The position of the comparison point is also determined by the position coordinates of the dot, which is the same coordinate reference system as the reference points. The comparison points are disposed at positions that are separated from the reference point by a predetermined distance as shown in FIGS. 10(a)–10(c). That is, the comparison points are disposed in such a manner that when a reference point contacts a fingerprint ridgeline, the corresponding comparison point will contact a fingerprint furrow line. Further, when the reference point contacts a fingerprint furrow line, the corresponding comparison point will contact a fingerprint ridgeline. The fingerprint image data output from the A/D converter 12 will have different intervals between the reference point and the comparison point in accordance with its resolution (number of dots). Consequently, if the resolution is low, the point (dot) immediately next to the reference point will be selected as the comparison point as shown in FIG. 10(a). As the resolution increases, the comparison point is selected, depending upon the resolution, at a point that is separated from the reference point by one dot as shown in FIG. 10(b), or at a point is separated from the reference point by two dots as shown in FIG. 10(c).

Figure 11:
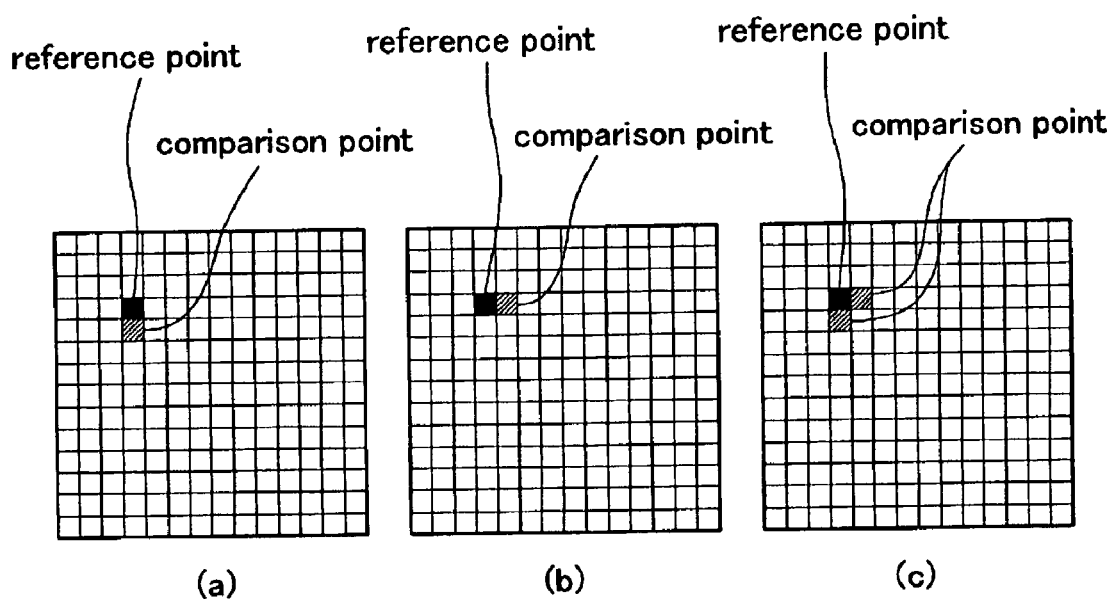
FIG. 11 shows an example of the relationship between a comparison point and a reference point provided within the fingerprint image.

In this embodiment, the comparison points are provided immediately adjacent to the reference points, as shown in FIGS. 11(a)–11(c), and a suitable pattern is chosen and utilized based upon these reference points. The pattern shown in FIG. 11(a) could be chosen in order to evaluate the fingerprint ridgeline extending in the x direction, and the pattern shown in FIG. 11(b) could be chosen in order to evaluate the fingerprint ridgeline extending in the y direction. When the pattern shown in FIG. 11(c) is chosen, the fingerprint ridgelines extending both in the x direction and y direction can be simultaneously evaluated by the two respective comparison points established in the x and y directions.

Figure 12:
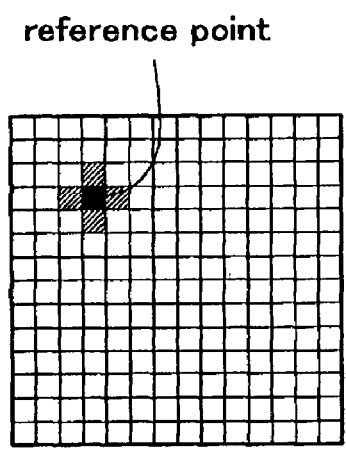
FIG. 12 shows another example of the relationship between comparison points and reference points provided within the fingerprint image.
Figure 12:
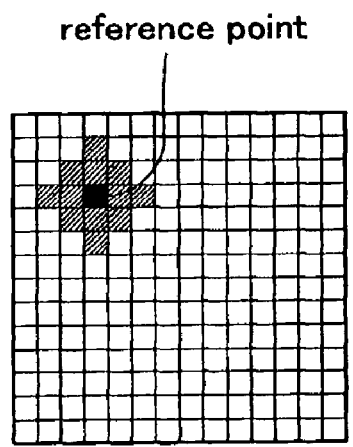
Figure 12:
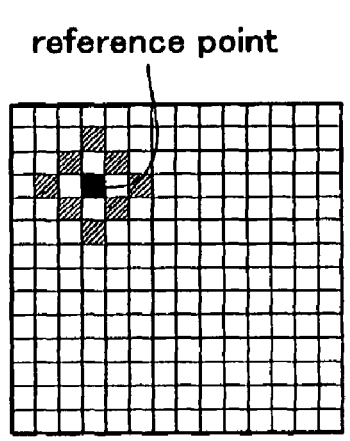
Figure 12:
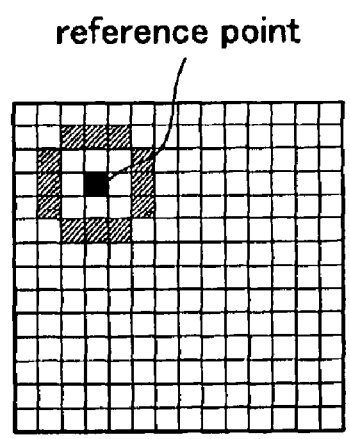
Figure 12:
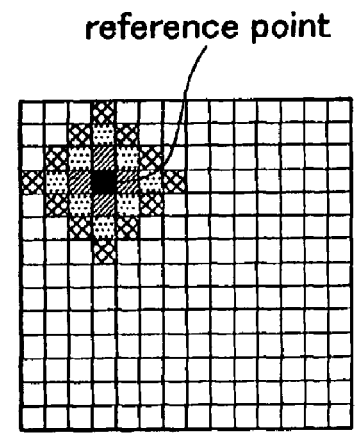

In this embodiment, the comparison points were provided according to the patterns shown in FIGS. 11(a)–11(c). However, a plurality of (more than three) comparison points also can be selected for each individual reference point as shown in FIGS. 12(a)–12(e). These patterns are used in cases in which the reference point and the comparison point both fall on a portion on the fingerprint ridgeline (or the fingerprint furrow line), depending on the direction in which the fingerprint ridgeline extends or the space between the fingerprint ridgelines. Consequently, judgment precision can be improved by providing a plurality of comparison points for each reference point. If the plural comparison points are separated from the reference point by different distances (the case shown in FIGS. 12(b) and 12(e)), the comparison points can be weighted according to the distance from the reference point, as shown in FIG. 12(e), and the density can be calculated. The comparison points are preferably weighted with consideration to the distances of the spaces between the fingerprint ridgelines.

Next, the calculation of the image quality determining value at a reference point will be explained. In this embodiment, the image quality determining value at a reference point is defined as the absolute value of the difference between the density at the reference point and the density at the comparison point.

Specifically, if the comparison point is selected as shown in FIG. 11(a), the image quality determining value $d_{b,a}$ of the reference point (a, b) can be obtained from equation 1, which is shown below. If the coordinates of the reference point are (a, b), the coordinates of the comparison point will be (a, b+1). Further, the density at each point is $S_{y,x}$. The density $S_{y,x}$ at each point on the fingerprint image is calculated based upon the fingerprint image data output from the A/D converter 12.

$$d_{b,a} = |S_{b,a} - S_{b+1,a}| \quad \text{(Equation 1)}$$

Similarly, if the comparison point is selected as shown in FIG. 11(b), the image quality determining value $d_{b,a}$ can be obtained from equation 2, as shown below.

$$d_{b,a} = |S_{b,a} - S_{b,a+1}| \quad \text{(Equation 2)}$$

If there is a plurality of comparison points, the absolute values of the density difference between the reference point and the comparison point is obtained for all comparison points, and the sum of the absolute values will be the image quality determining value. Specifically, the image quality determining value $d_{b,a}$ can be obtained from equation 3, which is shown below, when the comparison points are selected as shown in FIG. 11(c).

$$d_{b,a} = |S_{b,a} - S_{b+1,a}| + |S_{b,a} - S_{b,a+1}| \quad \text{(Equation 3)}$$

As clearly shown in the above equation, if the image quality determining value of each reference point shown in Equations 1–3 is high, the difference between the density of the reference point and the density of the comparison point will be high. Therefore, if the image quality determining value is high, it can be determined that one point, either the reference point or the comparison point, is on the fingerprint ridgeline, and the other, either the reference point or the comparison point, is on the fingerprint furrow line. Consequently, it can be determined that a fingerprint ridgeline is contained proximally to the reference point (fingerprint ridgeline information is contained) based upon the magnitude of the image quality determining value at the reference point.

In addition, the direction of the fingerprint ridgeline information contained in the reference point can be determined in accordance with the manner in which the comparison point was selected with respect to the reference point (the difference between FIGS. 11(a) and (b)). When FIG. 11(a) is selected (the case of Equation 1), the presence or absence of fingerprint ridgeline extending in the x direction can be determined. Further, when FIG. 11(b) is selected (the case of Equation 2), the presence or absence of fingerprint ridgeline extending in the y direction can be determined.

In this embodiment, the absolute value of the density difference was utilized as the image quality determining value of the reference point. However, it is not limited to this. For example, the square of the density difference, or a binary number of 1 or 0 (see Equation 4) obtained by comparing the density difference with a threshold value could be used as the image quality determining value of the reference point. When the density difference is compared with a threshold value and converted into a binary number, the image quality determining value of the reference point can be obtained from the expression shown below in Equation 4.

$$d_{b,a} = 1\{|S_{b,a} - S_{b,a+1}| \geq \theta(\text{threshold value})\} \text{ or } 0\{|S_{b,a} - S_{b,a+1}| < \theta\} \quad \text{(Equation 4)}$$

Figure 13:
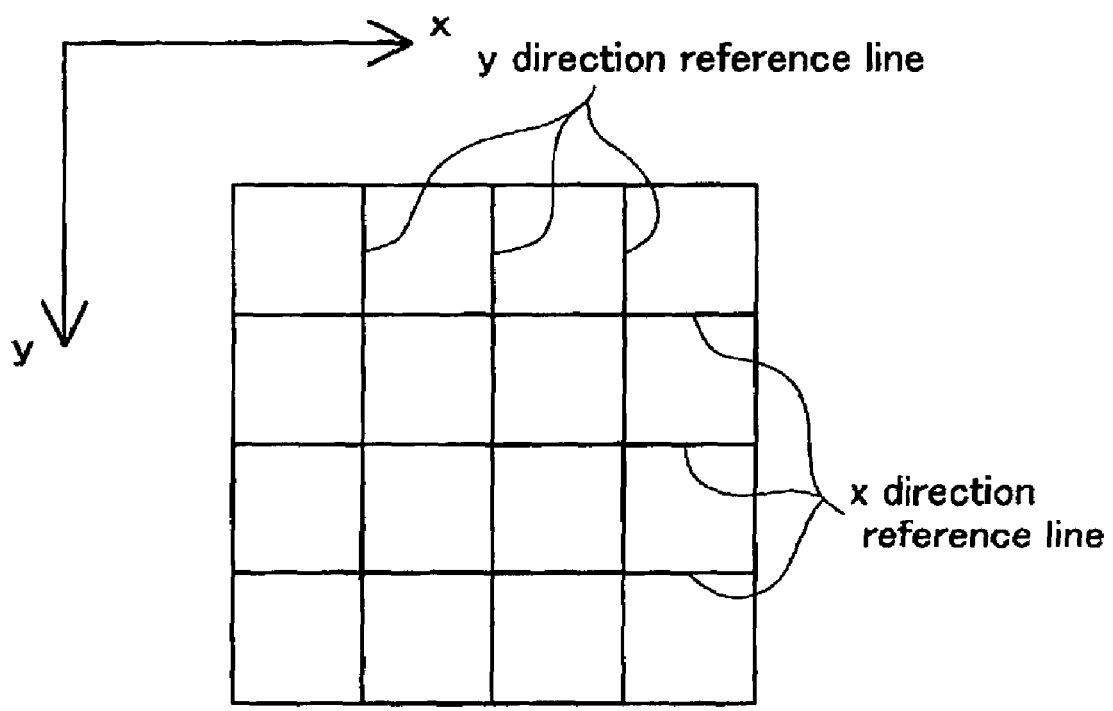
FIG. 13 shows a procedure for calculating an image quality determining value.

Next, a procedure for calculating the image quality determining value of the overall fingerprint image, based upon the image quality judgment value of each reference point obtained in the above-described steps, will be explained with reference to the example shown in FIG. 13. FIG. 13 shows a pattern of reference points provided within the fingerprint image. Only three reference lines are shown in the x direction and the y direction for the convenience of explanation.

As described above, the image quality determining value at a reference point is a value that determines whether fingerprint ridgeline information is contained within the area near the reference point. Therefore, in order to determine the amount of fingerprint ridgeline information contained within the entire fingerprint image, the sum (or average) of the image quality determining value at each reference point can be calculated as the image quality determining value of the fingerprint image. Evaluation can be made based upon the magnitude of this value.

In this embodiment, for the reference points on the reference line drawn in the x direction, the pattern shown in FIG. 11(b) is selected as a comparison point in order to determine whether the fingerprint ridgeline extends in the y direction. Further, for the reference points on the reference line drawn in the y direction, the pattern shown in FIG. 11(a) is selected as a comparison point to determine whether the fingerprint ridgeline extends in the x direction. Therefore, the image quality determining value of the reference line in the x direction, Ly (y=y1, y2, y3), and the image quality determining value of the reference line L in the y direction, Lx (x=x1, x2, x3), can be expressed as shown in the following equation. In this equation, $N_x$ represents the number of dots in the fingerprint image in the x direction and $N_y$ represents the number of dots in the fingerprint image in the y direction. In addition, when the pattern shown in FIG. 11(a) is used as a comparison point, the image quality determining value at the reference point is expressed as $d2_{y,x}$ (Equation 1). Further, when the pattern shown in FIG. 11(b) is used, the image quality determining value at the reference point is expressed as $d1_{y,x}$ (equation 2).

$$x \text{ direction; } Ly = \sum_{X=0}^{N_x-1} d1_{y,x}$$

$$y \text{ direction; } Lx = \sum_{Y=0}^{N_y-1} d2_{y,x}$$

(Equation 5)

Then, the image quality determining value of each reference line, which was obtained by Equation 5, is summed to express the image quality determining value of the fingerprint image. If this image quality determining value of the fingerprint image exceeds a predetermined threshold value, the fingerprint image is determined to include sufficient fingerprint ridgeline information.

In the above-described embodiment, the image quality determining value was obtained for each reference line, and the sum thereof was regarded as the image quality determining value of the fingerprint image. However, the image quality determining value can be calculated in a variety of different ways other than the above described example.

For example, the image quality determining values of the reference lines could be segregated into groups for the x direction reference line and the y direction reference line. Then, a representative value can be selected from each group of image quality determining values of the reference lines. In the alternative, these values can be suitably combined to make a representative value of each group. Then, the representative value can be utilized as the image quality determining value of the fingerprint image. The example shown in FIG. 13 will be explained in detail. The image quality determining values of the reference lines are grouped according to the x direction reference line and the y direction reference line. The respective smallest value (or average value) is made the representative value of the group Ym and Xm (refer to Equation 6). The smaller of the two values, Xm or Ym, can be made the image quality determining value of the fingerprint image. When this type of image quality determining value is greater than a predetermined threshold value, it can be determined that sufficient fingerprint ridgeline information is contained within each reference line (and in the fingerprint image).

$$Ym = \min\{L_{y1}, L_{y2}, L_{y3}\} \quad \text{(Equation 6)}$$

$$Xm = \min\{L_{x1}, L_{x2}, L_{x3}\}$$

In addition, the image quality determining value L of the reference line can be calculated using a statistical method. Specifically, the image quality determining values of each point (reference point) on the reference line are statistically analyzed and the resulting dispersion or standard deviation value is utilized as the image quality determining value. For example, when the dispersion or standard deviation values are utilized as the image quality determining value and that value is greater than a predetermined threshold value, the fingerprint image is determined to be clear. This is because, when the fingerprint image is obscured, the image quality determining values of each point on the reference line become approximately the same value, and the obtained dispersion and standard deviation values will decrease.

The method for using the above described statistical quantities, such as the dispersion and standard deviation, as a image quality determining value also can be used in the calculation of the image quality determining value of a reference point when a plurality of comparison points are utilized for one reference point.

In addition, the image quality determining value of each reference point, $d1_{y,x}$, $d2_{y,x}$, can be obtained, and the sum of these values can be used as the image quality determining value. In this case, the image quality determining value of the reference point for the x direction and the y direction can be weighted by weighting value W. The weighting value W can be determined, for example, by the ratio of the size of the fingerprint image in the x direction and the y direction. When this type of weighting value W is utilized, the image quality determining value can be calculated, for example, by Equation 7, as shown below.

$$\frac{W}{Nx-1} \sum_{Y=0}^{Ny-1} \sum_{X=0}^{Nx-1} d1_{y,x} + \frac{1-W}{Ny-1} \sum_{Y=0}^{Nx-1} \sum_{X=0}^{Ny-1} d2_{y,x} \quad \text{(Equation 7)}$$

(II) Frequency Converting the Densities Along the Reference Line and Evaluating the Spectral Characteristics In the fingerprint verification device of this embodiment, two methods are provided for evaluating the fingerprint image using spectral characteristics. One method (i) uses a spectrum of the ratio of the high frequency components and the low frequency components. The other method (ii) uses the peak magnitude of the spectrum. Either method (i) or (ii) can be appropriately selected. A process for calculating the image quality determining value in each above-mentioned case, (i) and (ii), will be explained as follows.

(i) Determining the Ratio of a High Frequency Component and a Low Frequency Component Within a Spectrum When spectrum characteristics are compared, a reference line is first disposed within the fingerprint image. The density of each point on the reference line is obtained. The change in the densities is regarded as a time series signal. Then, the time series signal must be frequency converted to obtain a waveform spectrum.

Figure 14:
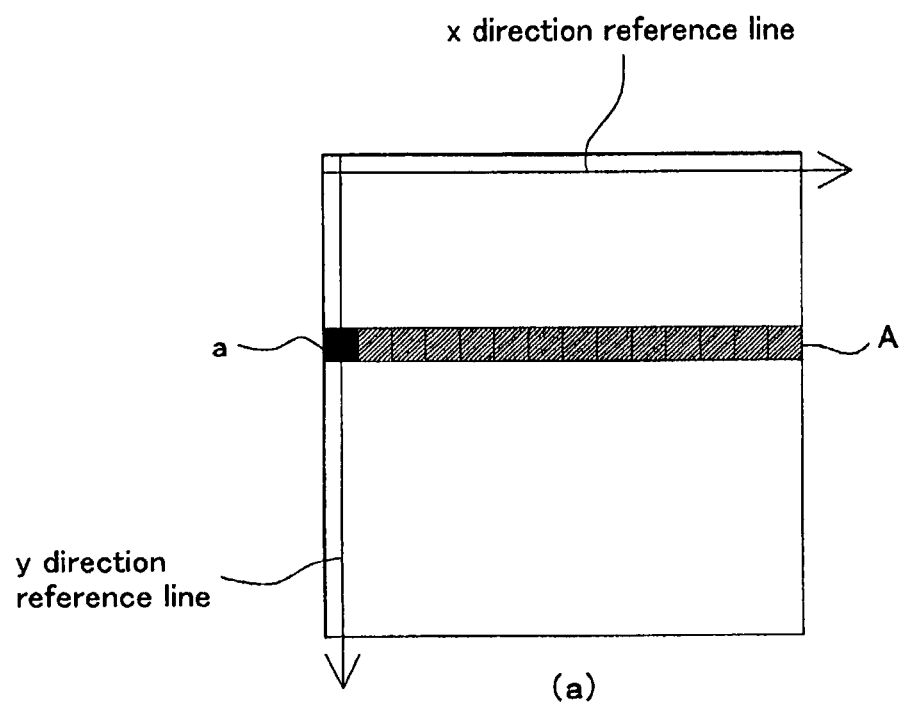
FIG. 14 shows a procedure for calculating the image quality determining value based upon the ratio of high frequency and low frequency components within the spectrum.
Figure 14:
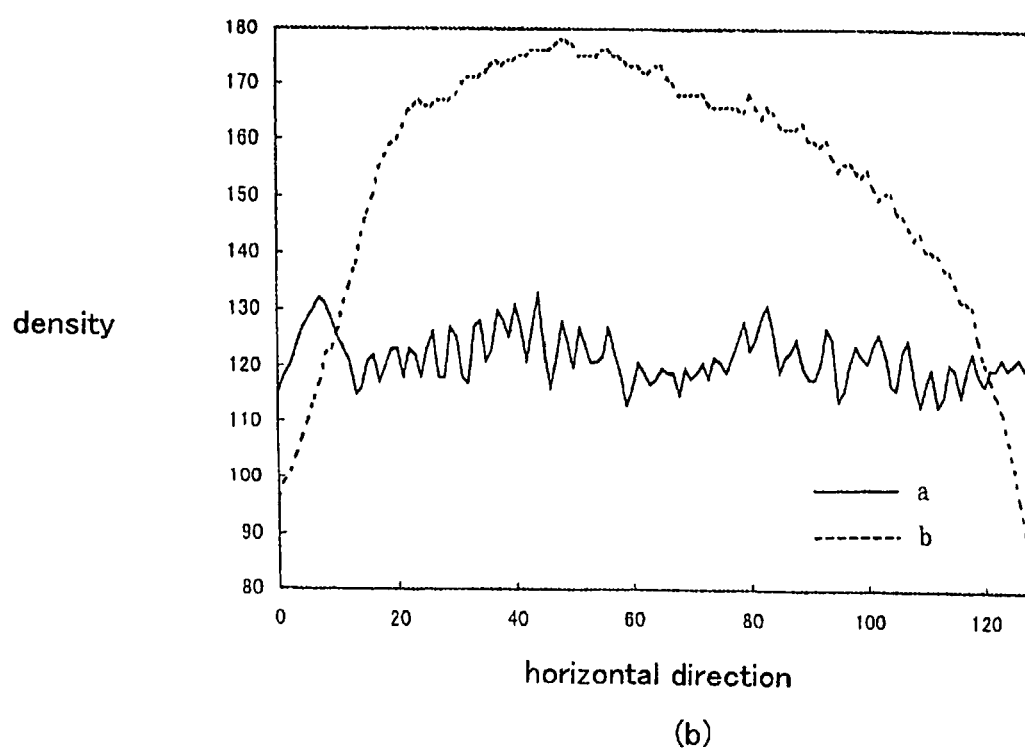

Therefore, as shown in FIG. 14(a), reference lines in the x direction (horizontal direction) and the y direction (vertical direction) are first disposed within the fingerprint image (n×m dots) output from the A/D converter 12. By establishing reference lines in two directions in this manner, fingerprint ridgelines extending in both the x and y directions can be evaluated.

Next, the densities of the points on the above-described reference line are measured. The same method is used to measure the densities of the points on the reference lines in the x and y directions. Therefore, a method for obtaining the density of a point on the reference line in the y direction will be explained as follows.

As shown in FIG. 14(a), the density of a point (a) on the reference line is defined as the average value of the density in area A, which area A extends from the point (a) in the perpendicular direction with respect to the y direction reference line. By defining the density at point (a) on the reference line as an average density for each point contained in area A, the effect of a noise component can be removed.

After the density of each point on the reference line is measured, a waveform is generated from the measured densities and the waveform shows the variation of densities along the reference line as shown in FIG. 14(b). FIG. 14(b) shows waveforms generated according to the above-described process and waveform (a) is from a clear fingerprint image, whereas waveform (b) is from an obscured fingerprint image (the fingerprint image shows a residual fingerprint in this example).

As clearly shown in FIG. 14(b), waveform (a), which was generated from a clear fingerprint image, has a jagged waveform (i.e., a highly oscillating waveform). Further, waveform (b), which was generated from an obscured fingerprint image, has a smooth waveform (i.e., a low oscillation waveform). Consequently, waveform (a), which was obtained from a clear fingerprint image, tends to contain a strong AC component and a weak DC component. Further, waveform (b), which was obtained from an obscured fingerprint image, tends to contain a strong DC component and a weak AC component. Therefore, the spectrum obtained by performing frequency analysis on a clear fingerprint image will have strong high frequency component and weak low frequency component.

After a waveform shown in FIG. 14(b) is obtained, frequency conversion (Dispersion Fourier transform is used in this embodiment) is performed on the waveform, which is regarded as a time series signal. Then, its spectrum, F (i) where (i=0, . . . n-1) is obtained. The image quality determining value is obtained from the spectrum F (i).

As intimated above, the high frequency component in the spectrum F (i) of a clear fingerprint image (waveform (a) shown in FIG. 14(b)) is larger than the high frequency component in the spectrum F (i) of an obscured fingerprint image (waveform (b) shown in FIG. 14(b)).

Consequently, in this embodiment, the ratio of a geometric mean of the low frequency component and the high frequency component is utilized as the image quality determining value of the reference line. The low frequency component is expressed as F (0) and the high frequency component is expressed as F (1)–F (n–1) (Equation 8).

$$10\log_{10}\left\{\frac{\sqrt[N-1]{\prod_{j=1}^{N-1} F(i)}}{F(0)}\right\}$$ (Equation 8)

The image quality determining value of the reference line is obtained for each reference line (i.e., two lines, one x direction reference line and one y direction reference line in this embodiment). Then, the sum of the image quality determining value of each reference line (or average, maximum value, minimum value, etc.) is defined as the image quality determining value of the fingerprint image. If this image quality determining value exceeds a predetermined threshold value, the fingerprint image is then determined to be a clear fingerprint image.

Figure 20:
FIG. 20 shows a residual fingerprint and the analyzed data.
Figure 20:
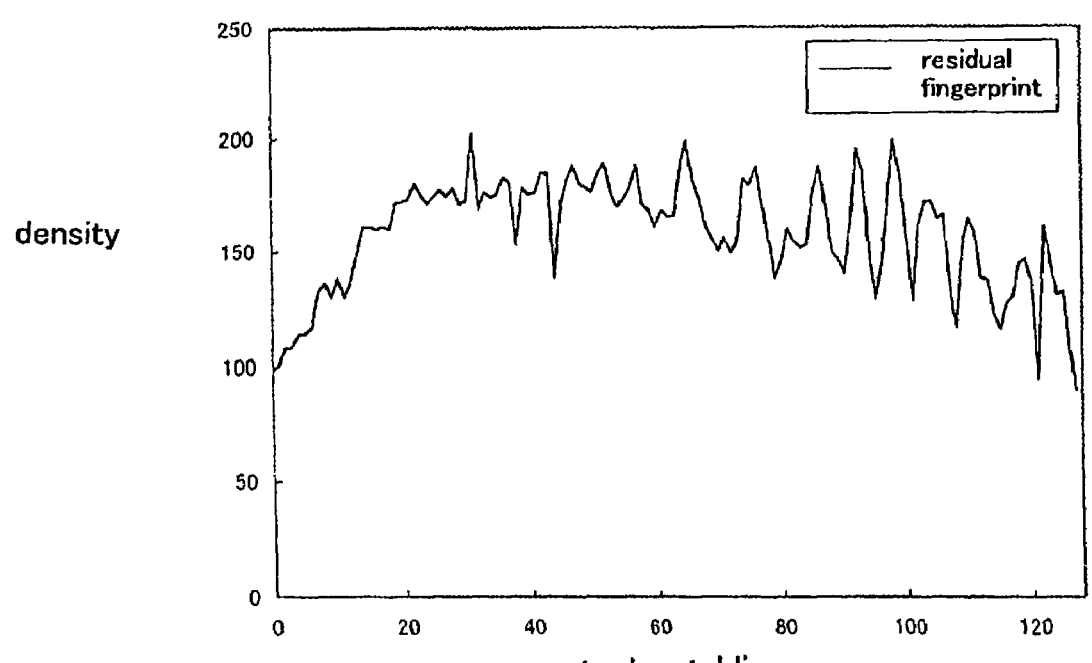

In the above-described method, the average density in area A is used as the density of the point on the reference line. Therefore, a fingerprint image that includes a residually recorded fingerprint can be easily determined to be an obscured fingerprint image. That is, the density waveform of a fingerprint image that includes a residually recorded fingerprint (refer to FIG. 20(a)) will be jagged, as shown in FIG. 20(b), if it is not averaged. Therefore, the determination of whether the image is a record of a residual fingerprint or a clear fingerprint image cannot be easily performed. However, as described above, by averaging the density, the jagged edge is removed from the waveform (smoothed), as shown in FIG. 14(b). Consequently, an obscured fingerprint image (residual fingerprint) can be easily identified. In addition, because an image that includes a residual fingerprint contains a strong DC component, images including residual fingerprints also can be determined by the size of the 0th order component of the obtained spectrum.

Also, in the above described example, the density of the point (a) on the reference line is defined as an average of the density of all points contained in the area A. However, this average density is not limited to this type of example. For instance, the average value of the density within a predetermined area (i.e., a predetermined number of dots) containing the point on the reference line could be utilized as the density of a point on the reference line. In this case, the entire fingerprint image is preferably evaluated by providing a plurality of reference lines, instead of only using one in each direction.

Also, when the image quality determining value of the fingerprint image is obtained from the image quality determining value of each reference line, weighting could be applied in the x direction or the y direction, which the same as in the above described example.

Furthermore, in the above described example, an FFT spectrum was obtained using a frequency conversion process. However, the image quality determining value of equation 8 could be calculated by obtaining an LPC spectrum or a GDS in addition to the FFT spectrum.

(ii) Evaluating the Magnitude of the Spectrum Peak

In this embodiment, the magnitude of spectrum peak is evaluated by expressing the absolute value of the GDS, which is integrated in the frequency direction, as the image quality determining value (case (ii-a)). In the alternative, the magnitude of spectrum peak is evaluated by expressing a numerical value, which can determine the magnitude of the rise and fall of the GDS, as the image quality determining value (case (ii-b)). Procedures for calculating the image quality determining value for each above described case will be explained as follows.

(ii-a) Expressing GDS as the Image Quality Determining Value

Figure 15:
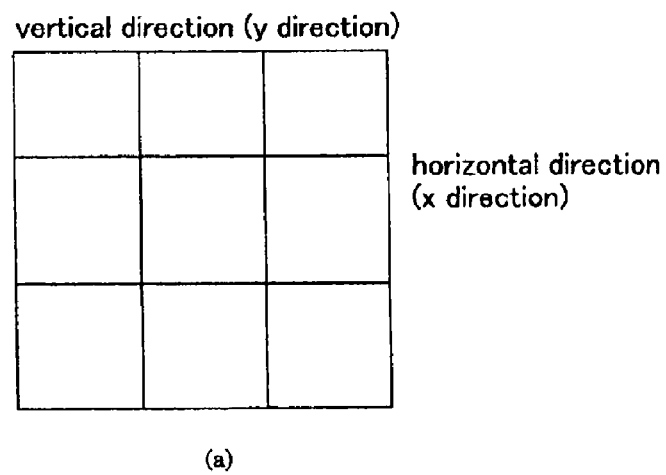
FIG. 15 shows a procedure for obtaining a GDS from fingerprint image data.
Figure 15:
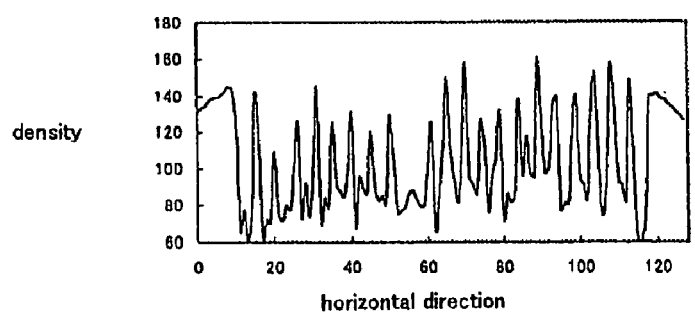
Figure 15:
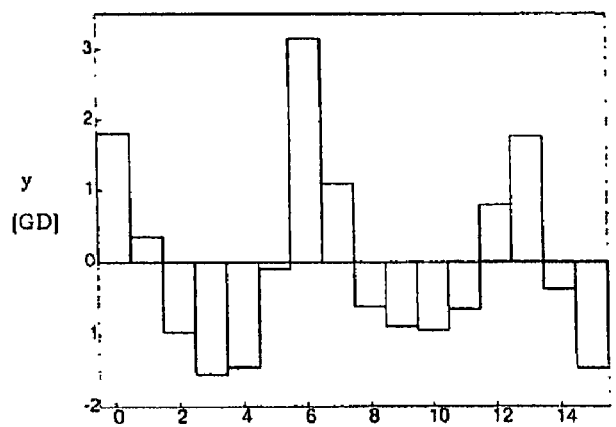

The procedure for determining the area of the GDS will be explained with reference to FIG. 15. If the area of the GDS will be determined, a plurality of reference lines is disposed in the x direction and y direction within the fingerprint image as shown in FIG. 15(a). Then, a waveform, as shown in FIG. 15(b), is generated from the density of the points on each reference line in the x direction and the y direction. Then, the intensity G (i) where (i=0 through CH–1) of the GDS within each frequency channel (0 through CH–1) may be generated from the waveform shown in FIG. 15(b) using any known method (refer to FIG. 15(c), in which the frequencies are separated into channels 0–14). After the intensity G (i) of each reference line is calculated, the absolute values of the intensity G (i) of the GDS are integrated in the frequency direction in order to obtain the image quality determining value of the reference line. That is, the image quality determining value of the reference line can be expressed by the following equation.

$$\text{Image quality determining value of the reference line} = \int |G(\theta)|d\theta$$ (Equation 9)

$$= \sum_{i=1}^{CB-1} |G(i)|$$

After the image quality determining value of each reference line is calculated, the sum (or average, maximum, minimum, etc.) of the image quality determining values of each reference line is calculated, and this value will represent the image quality determining value of the fingerprint image. This image quality determining value (area of GDS) increases as the magnitude of the spectrum peak increases. Therefore, when the image quality determining value exceeds a predetermined threshold value, the fingerprint image can be determined to contain sufficient fingerprint ridgeline information.

The image quality determining value of the reference line also could be weighted according to the direction (distinction of x, y direction) of the reference line in this example.

(ii-b) Expressing the Magnitude of the Rise and Fall of the GDS as the Image Quality Determining Value In this case, a plurality of reference lines is also provided in the x and/or y directions within the fingerprint image. The waveform shown in FIG. 15(b) is obtained for each reference line, and the intensity G (i) (i=0 through CH−1) of the GDS is calculated from the obtained waveform. Up to this point, the procedure is the same as in the above described example (ii-a).

However, in example (ii-b), the procedure for obtaining the image quality determining value of fingerprint image from the intensity G (i) of GDS, which is obtained separately from each reference lines, differs from the above described example (ii-a). Therefore, in the following explanation, the procedure for calculating the image quality determining value of the fingerprint image from the intensity of the GDS, which is obtained separately from each reference line, will be described in detail.

Figure 16:
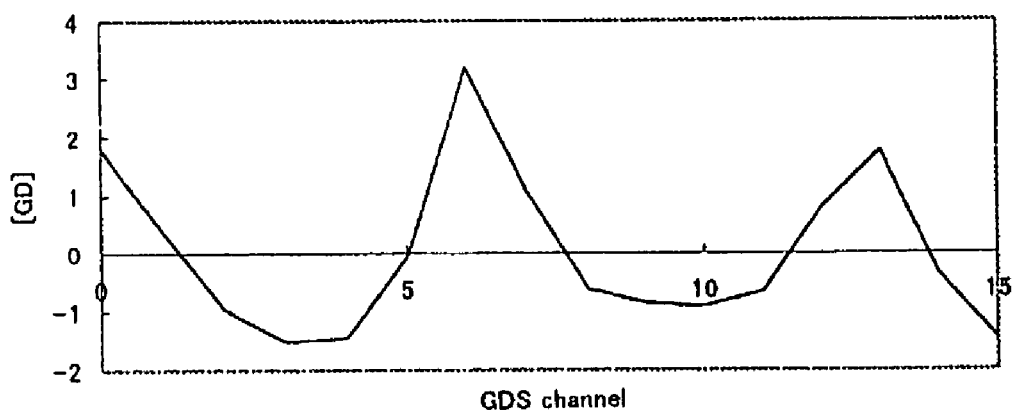
FIG. 16 shows GDS curves for adjacent reference lines.
Figure 16:
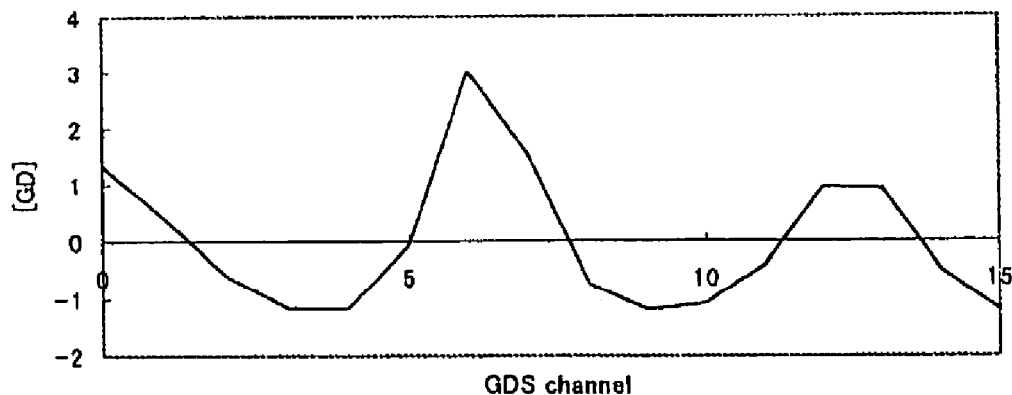

Before explaining the procedure for calculating the image quality determining value, other spectral characteristics exhibited in the spectrum obtained from the fingerprint image will be explained. The waveforms of the GDS of adjacent reference lines in a fingerprint image are shown in FIG. 16.

As shown in FIGS. 16(a) and 16(b), the waveforms of the GDS in adjacent reference lines (reference lines drawn in the same direction) exhibit similar characteristics. Because the fingerprint ridgelines are continuous, the spectral characteristics of adjacent reference lines tend to be very similar. Therefore, if the average intensity of the GDS in the same frequency is obtained from adjacent reference lines, the effect of noise contained within the fingerprint image can be reduced (i.e., the noise component may be removed).

Figure 17:
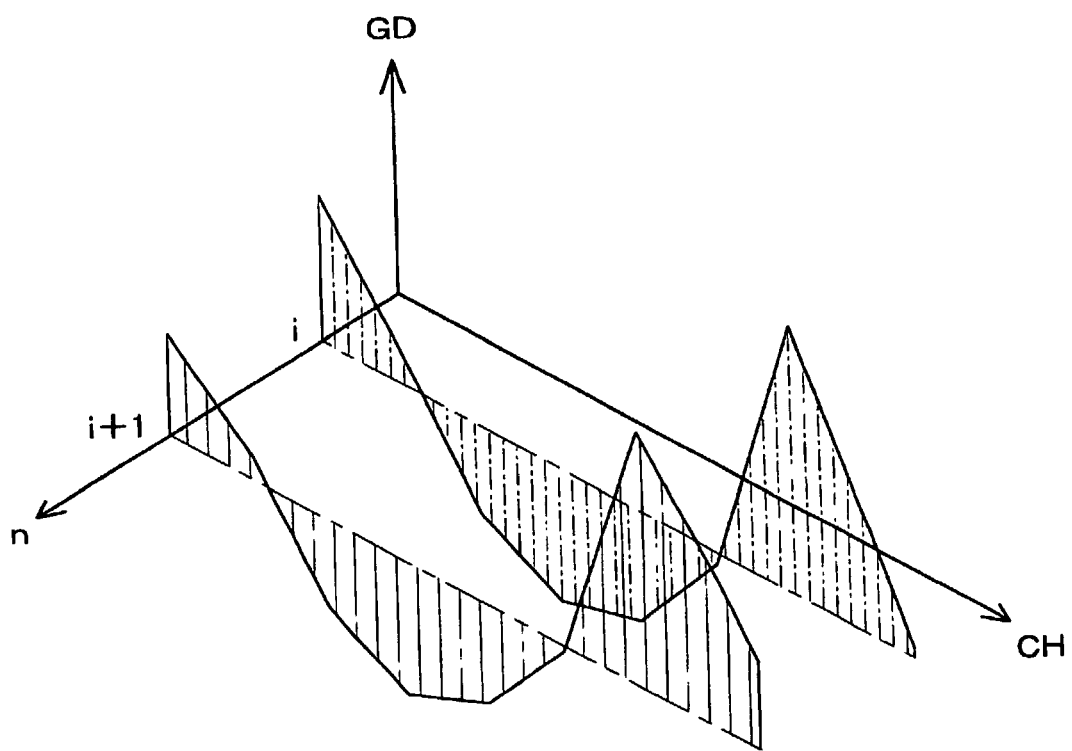
FIG. 17 shows the relationship between the amplitude of the GDS and the frequency and the position of the reference line.

Therefore, in this embodiment, the GDS obtained for each reference line along the same direction is expressed in three dimensions as shown in FIG. 17. That is, the GDS is plotted on coordinates comprising the position n of the reference line, frequency CH, and the GDS intensity GD in order to calculate the image quality determining value. If the position of the reference line is expressed as n1, and the frequency is expressed as ch1, the GDS intensity can be expressed as G (n1, ch1).

In FIG. 17, the relationship of the GDS obtained only from the analysis of the spectrum in the x direction based upon the x direction reference line (refer to FIG. 15(a)) is shown. However, the relationship of the GDS obtained from the analysis of the spectrum in y direction based upon the y direction reference line can be obtained in the same manner. Because the procedures for obtaining the image quality determining value for the x direction and the y direction are the same, only the case of the x direction will be described in the following explanation.

As described above, the intensity of the GDS can be expressed as a function in which the position of the reference line n1 and frequency ch1 are variables. Therefore, the image quality determining value can be calculated in the same manner as in the above described case (I), in which the density of the reference point and comparison point are compared. That is, a plurality of reference points are disposed in the n-CH plane (i.e., a plane formed by the position of the reference line and the frequency) as shown in FIG. 17, and comparison points are disposed proximally to the reference points. Then, the image quality determining value (i.e., the absolute value of the difference of the GDS intensity between the reference point and the comparison point) is calculated for each reference point. The image quality determining value of the fingerprint image data is calculated from the image quality determining value of each separately obtained reference point. The procedure for calculating the image quality determining value will be described in detail as follows.

First, a reference point is disposed within the n-CH plane in order to calculate the image quality determining value. In this embodiment, the frequency ch is expressed as a digitized integer (0 through CH−1). Therefore, the reference point can be represented by its coordinates (a1, b1) (a1, b1 are integers) in the same manner as in the above described example (I). Also, the pattern of reference points disposed in the n-CH plane can be selected from the pre-determined patterns shown in FIGS. 9(a)–9(i). The selection is made with consideration to the requirements of processing time for the image quality determining value, detection precision, and the particular application.

Next, comparison points are provided for each reference point established as described above. If the fingerprint image is clear, the magnitude of the rise and fall of the GDS shows a characteristic of increasing in the frequency direction (CH direction), as was explained above. Therefore, the comparison point is disposed at a predetermined position within the frequency direction. Consequently, the coordinate of the comparison point is represented as (a1, b1+n) (n is a suitable integer).

Therefore, the image quality determining value, $d_{a1,b1}$ at the reference point (a1, b1) is the difference of the GDS intensity between the reference point and the comparison point.

$$d_{a1,b1} = |G(a1, b1) - G(a1, b1+n)| \quad \text{(Equation 10)}$$

The sum (or average) of the image quality determining value of each reference point obtained from the above shown Equation 10 is the image quality determining value of the x direction. The image quality determining value of the y direction is obtained by the same procedure. The image quality determining values, which are obtained for each of the x direction and the y direction, are added to obtain the image quality determining value of the fingerprint image. The spectrum peak of the GDS increases as the image quality determining value of the fingerprint image increases. Therefore, if the image quality determining value of the fingerprint image is high, naturally the fingerprint image will contain a large amount of fingerprint ridgeline information.

Figure 18:
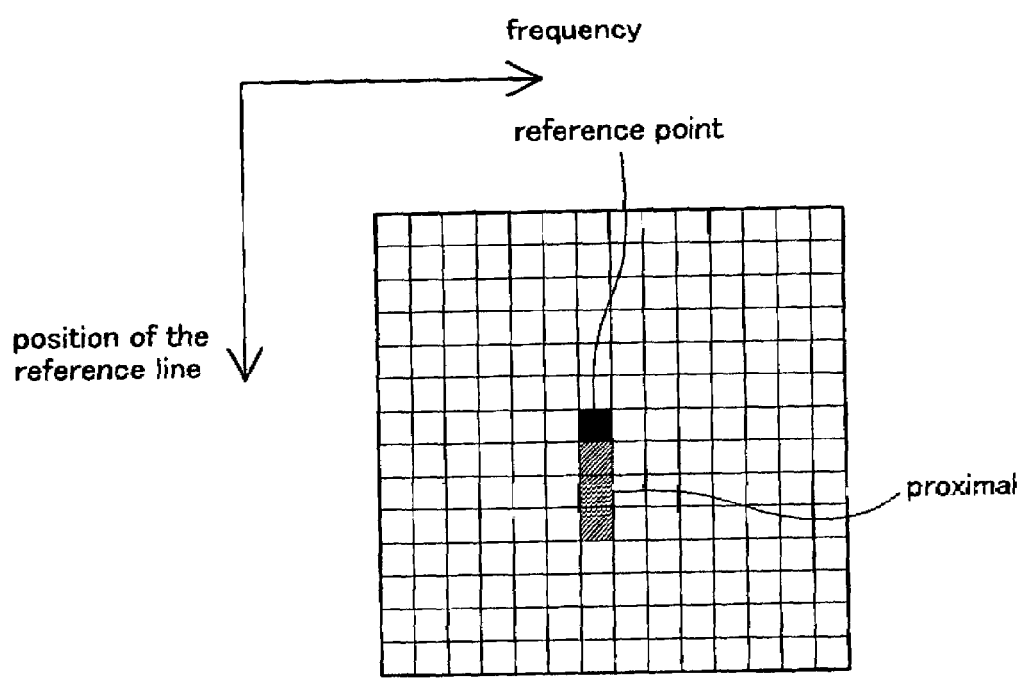
FIG. 18 shows a procedure for removing noise contained in the GDS.

In this embodiment, noise is removed by utilizing the fact that the waveforms of the GDS in adjacent reference lines are very similar. Therefore, the GDS intensity at a point (a1, b1) on the n-CH plane uses the average spectrum of the GDS at a plurality of points of the same frequency b1 proximal to the point (a1, b1). Specifically, the average spectrum of the GDS of the area, which is indicated by diagonal lines including the point (a1, b1) in FIG. 18 (area of same frequency), is used as the GDS intensity of the point (a1, b1).

In addition, it would be acceptable to remove noise effects by disposing a plurality of comparison points near the reference point, as shown in FIGS. 12(a)–12(e), either separately or simultaneously with the above described method.

In the above described example, the absolute value of the difference in the GDS was used as the image quality determining value. However, the image quality determining value is not limited to the above example. For example, the square of the difference of the GDS, or a binary number of 0 or 1, which is derived from the result of comparing the absolute value of the difference in the GDS with a threshold value (refer to equation 4), can be used as the image quality determining value of the reference point.

Also, the image quality determining value obtained from the spectrum analysis in the x direction and the image quality determining value obtained from the spectrum analysis in the y direction can be weighted in the same manner as in the above-described example (I), in order to obtain the image quality determining value of the fingerprint image.

The characteristic parameter extraction portion 16 extracts the characteristic parameters from the image data that was determined to be effective by the fingerprint image judgment portion 14. Methods for extracting the characteristic parameters are known (e.g., Japanese Laid Open Patent Publication No. 6-60167) and thus, a detailed explanation will be omitted. In addition, the operation of the fingerprint registration portion 18 and the fingerprint verification portion 20 will be explained in detail in the following explanation. Therefore, their detailed description will be omitted here.

Figure 2:
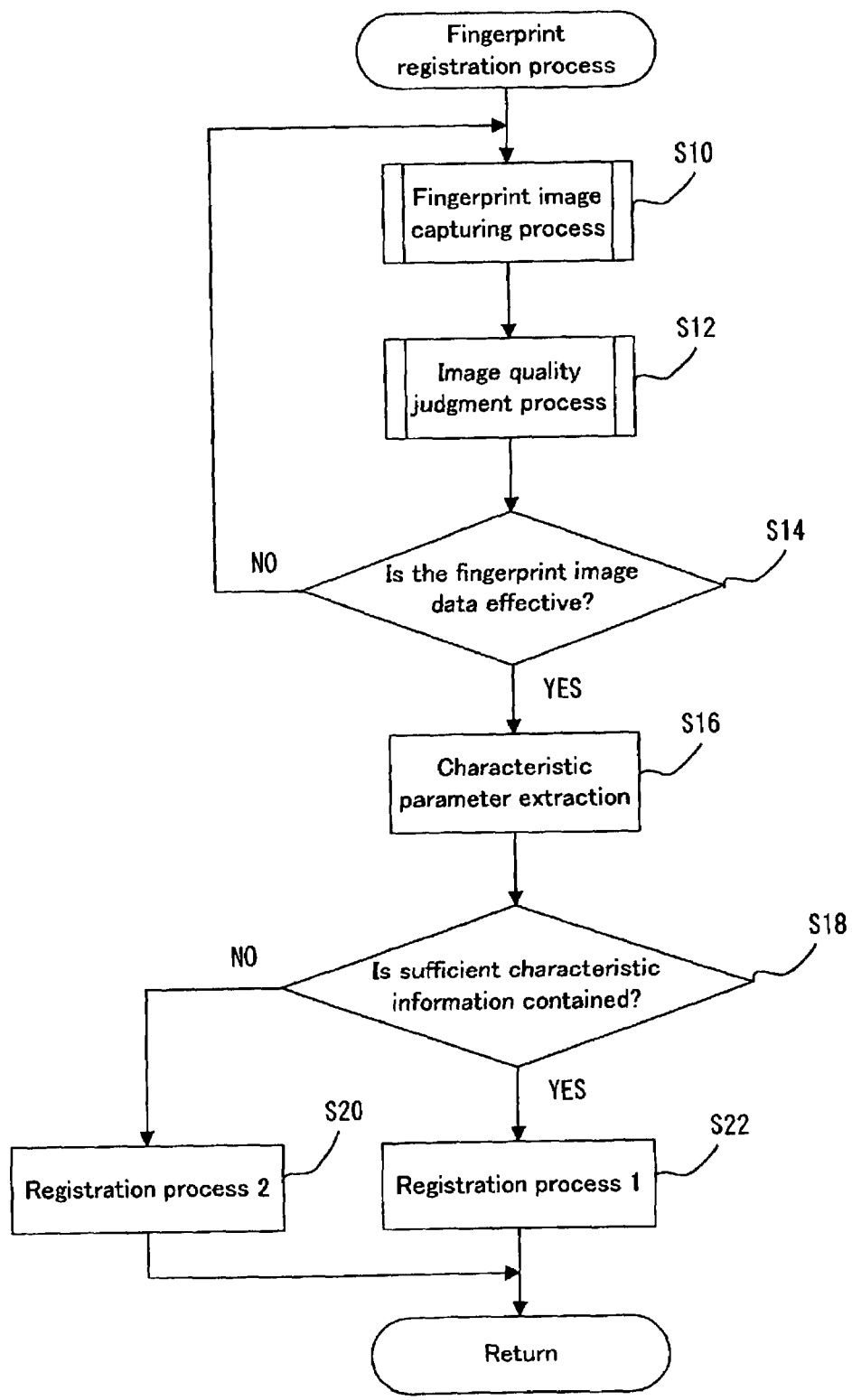
FIG. 2 is a flow chart showing the steps of a fingerprint registration process.
Figure 3:
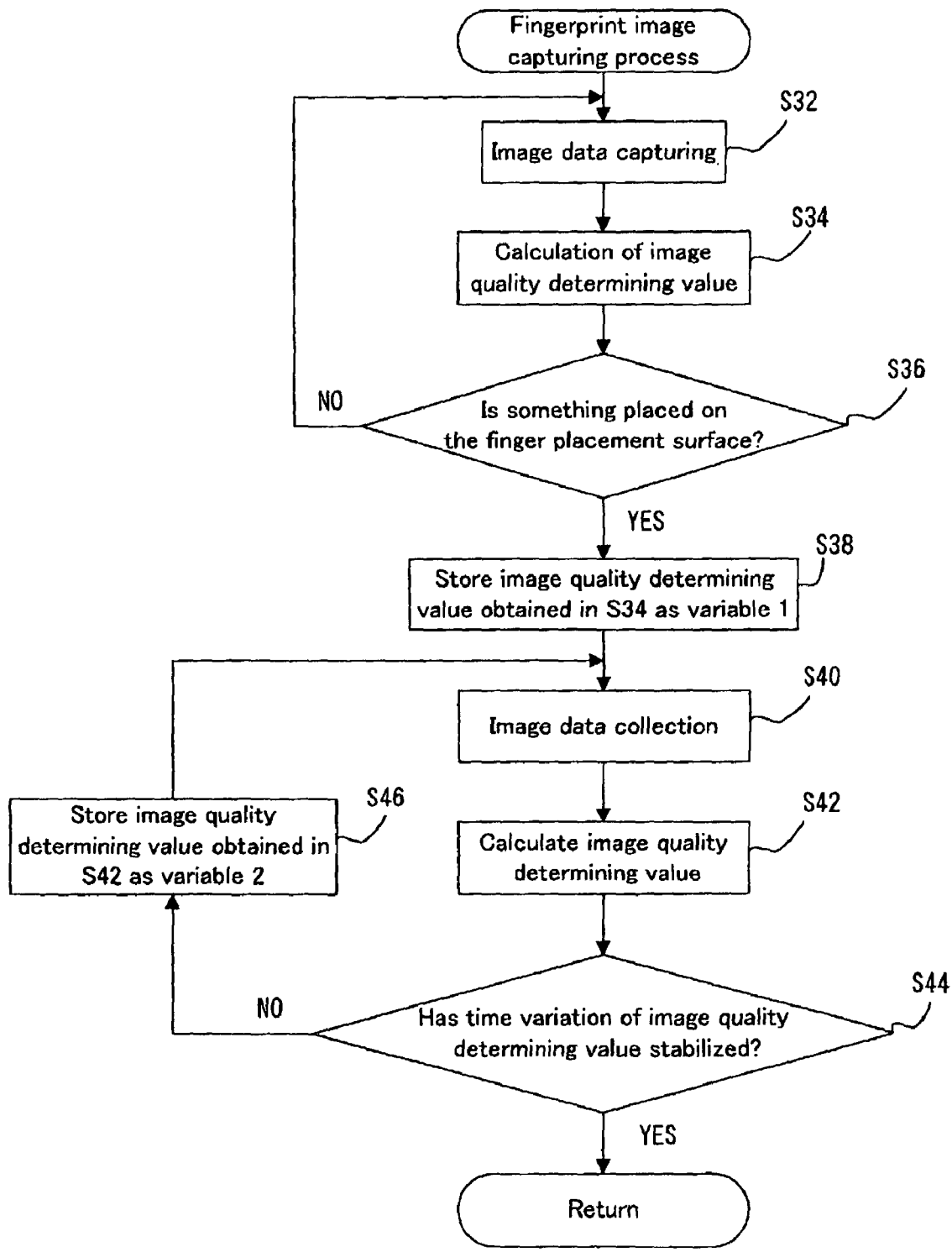
FIG. 3 is a flow chart showing the steps of a fingerprint image collection process.
Figure 4:
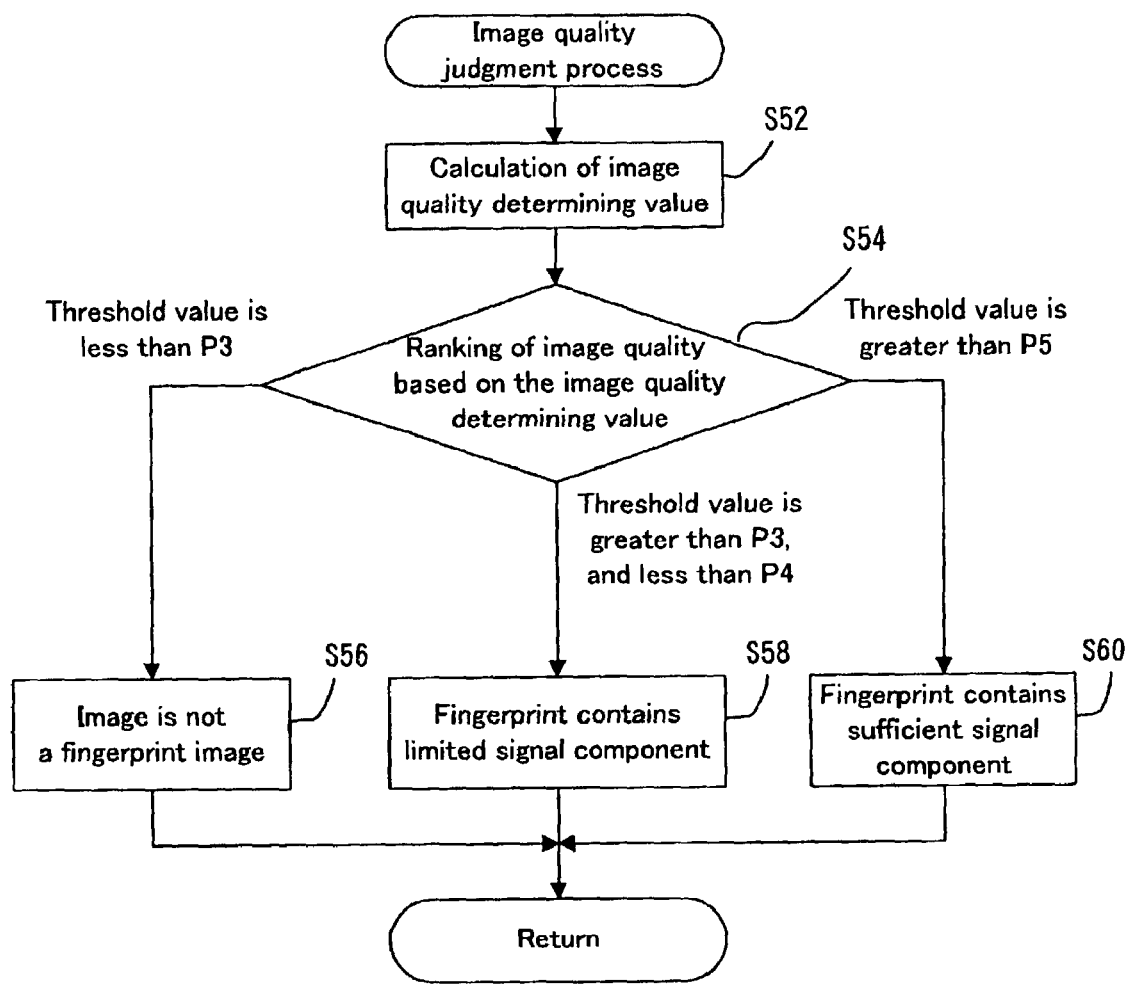
FIG. 4 is a flow chart showing the steps of an image quality determining process.

Next, the operation of the fingerprint verification device, which is constructed as described above, during the "fingerprint registration time" will be explained with reference to the flow charts shown in FIGS. 2–4. If the input portion 24 is operated in order to register a person to be identified as a registered person, a registration command is output from the input portion 24 to the controller 22. The controller 22 outputs an instruction to the fingerprint image capturer 10 in order to start the fingerprint image collection process. Then, the fingerprint image collection process is started by the fingerprint image capturer 10 (S10).

The fingerprint image collection process will be explained with reference to FIG. 3. In order to collect a fingerprint image, the fingerprint image capturer 10 and the A/D converter 12 are first turned ON to collect the image data (S32). After the image is collected in step S32, the image quality determining value is calculated by the fingerprint image judgment portion 14 based upon the image data (S34). The image quality determining value calculated in step S34 is calculated by one of the various, above described methods.

Next, the image quality determining value calculated in step S34 is compared with a predetermined threshold value P1, thereby determining whether a finger has begun to be placed on the upper surface 121 of the right angle prism 120 (S36). That is, as a finger begins to be placed on the upper surface of the right angle prism 120, the pressure exerted onto the prism gradually increases. This pressure will cause the image quality determining value calculated in step S34 to gradually increase. Therefore, when the image quality determining value calculated in step S34 exceeds the predetermined threshold value P1, it is determined that a finger has begun to be placed on the upper surface 121 of the right angle prism 120. On the other hand, if the image quality determining value does not exceed the threshold value P1, it is determined the finger has not yet started to be placed on the upper surface 121 of the right angle prism 120. If it is determined in step S36 that the finger has not yet started to be placed on the prism, the process returns to step S32 and repeats the steps between S32 and S36.

The method for determining whether a finger has begun to be placed on the prism is not limited to the above described example. For example, the Finger placement determination can be performed by making use of the large time variation of the image quality determining value that occurs when the finger begins to be placed on the prism.

If it is determined in step S36 that a finger has begun to be placed on the upper surface 121 of the right angle prism 120, the process advances to step S38, and stores the image quality determining value calculated in step S34 as variable 1 (S38). Then, the fingerprint image capturer 10 and the A/D converter 12 are again turned ON to operating status, and the image data is collected (S40). After the image data is collected in step S40, the fingerprint image judgment portion 14 calculates the image quality determining value based upon the collected image data (S42). The image quality determining value, which is calculated in step S42, is calculated using the same method that was used to calculate the image quality determining value in step S34.

After the image quality determining value is calculated in step S42, the calculated image quality determining value is compared with the image quality determining value stored as variable 1 in step S38, thereby determining whether the time variation of the image quality determining value has stabilized (S44). Specifically, the image quality determining value stored as variable 1 is subtracted from the image quality determining value calculated in step S42. If the result has become less than a predetermined threshold value P2, it is determined the time variation of the image quality determining value has stabilized. As a result, it can be determined whether the finger pressure applied to the upper surface 121 of the right angle prism 120 has stabilized.

If it is determined the time variation of the image quality determining value has not yet stabilized in step S44, the image quality determining value calculated in step S42 is stored as variable 1. Then, the processes in steps S40, S42, S44 are repeated. On the other hand, if it is determined the time variation of the image quality determining value has stabilized in step S44, the fingerprint image collection process is completed.

After fingerprint image collection process is completed, returning to FIG. 2, the image quality judgment process is then performed on the collected fingerprint data (S12). The image quality judgment process will be explained with reference to FIG. 4.

In the image quality judgment process, the image quality determining value of the fingerprint image collected by the fingerprint image capturer 10 is first calculated (S52). The image quality determining value calculated in step S52 is calculated using an increased number of processing steps in order to increase the judgment precision, as compared with the image quality determining value calculated in the above described step S42.

After the image quality determining value is calculated in step S52, the image data is classified into three groups of image data based upon the calculated image quality determining value (S54). That is, if the calculated image quality determining value is less than a predetermined threshold value P3, the image is determined not to be a fingerprint (i.e., an image having insufficient fingerprint ridgeline information) (S56). If the image quality determining value is greater than the threshold value P3, but less than a threshold value P4, it is determined the fingerprint image contains limited fingerprint ridgeline information (S58). If the calculated image quality determining value is greater than the threshold value P4, it is determined the fingerprint image contains sufficient fingerprint ridgeline information. Then, the image quality judgment process is completed.

If the image quality judgment process is completed, returning to FIG. 2, a determination is made as to whether the fingerprint image collected by the fingerprint image capturer 10 is effective (S14). That is, by using the above described image quality judgment process, the image data is determined to be either a fingerprint image having sufficient fingerprint ridgeline information or a fingerprint image having limited fingerprint ridgeline information and this image data will be regarded as effective image data. Then, the process advances to step S16. If the image data is determined not to be a fingerprint image, the collected image will be regarded as ineffective image data and the processes in steps S10, S12, and S14 will be repeated.

After the collected fingerprint image is determined to be effective fingerprint data (YES in step S14), the characteristic parameters are extracted from the image data by the characteristic parameter extraction portion 16 (S16).

After the characteristic parameters are extracted, it is determined whether the image data, from which the characteristic parameters were extracted, contains sufficient ridgeline information (S18). That is, if the image quality judgment process in step S12 determines that the image data has limited fingerprint ridgeline information, the process advances to step S20. If the image data is determined to have sufficient fingerprint ridgeline information, the process advances to step S22.

In step 20, registration process 2 is performed. That is, the image data is categorized according to the characteristic parameters extracted from image data having limited fingerprint ridgeline information, and an ID code and password are input using the input portion 24. The characteristic parameters are registered in the memory 26 after the image data is related to the ID code and password.

If the process advances to step S22, registration process 1 is performed. That is, the image data is categorized according to the characteristic parameters extracted from image data having sufficient fingerprint ridgeline information, and only an ID code is input from the input portion 24. The characteristic parameters are registered in the memory 26 after the image data is related to the ID code.

The reason for changing the content of the registration process according to the amount of fingerprint ridgeline information in this manner is as follows. The condition for determining the verification is relaxed for a person to be identified, if registration process was performed using image data containing limited fingerprint ridgeline information, but the prerequisite condition of the matching password is satisfied. This prevents a situation in which a person is refused entry at the time of verification.

Figure 5:
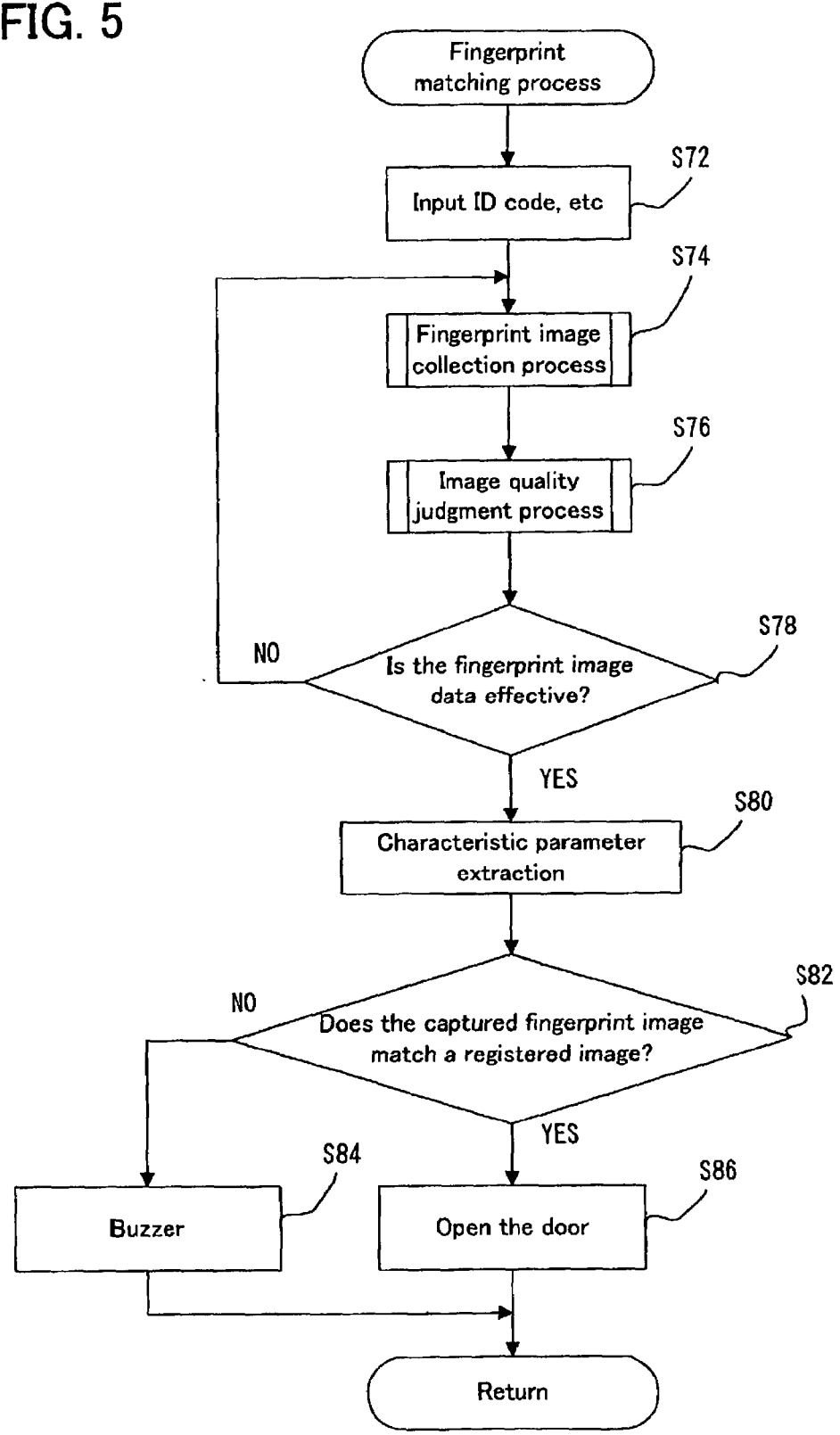
FIG. 5 is a flow chart showing the steps of a fingerprint verification process.

Next, the operation of the fingerprint verification device during the "fingerprint verification time" will be explained with reference to the flowchart shown in FIG. 5. If a person to be identified enters a request for fingerprint verification from the input portion 24, the controller 22 will display the message "Please enter your ID code." The person to be identified will enter the ID code (for those who registered a password at the time of fingerprint registration, ID code and password) using the input portion 24 (S72). When the ID code is input using the input portion 24, the above described fingerprint image capture process (refer to FIG. 3) will be performed (S74). After the fingerprint image collection process is completed, the above described image quality judgment process (refer to FIG. 4) will be performed (S76). Then, a determination is made as to whether the image data collected by the fingerprint image capturer 10 is effective (S78). A determination of effectiveness in step S78 operates in the same way as in the above described "fingerprint registration time." That is, image data, which is determined by the image quality judgment process to be an image data other than a fingerprint image, is determined to be ineffective. Further, image data, which is determined to contain limited fingerprint ridgeline information, and image data, which is determined to contain sufficient fingerprint ridgeline information, are determined to be effective. If the image data is determined to be ineffective in step S78 (NO in step S78), the processes in steps S74, S76, and S78 are repeated.

If it is determined to be effective in step S78 (YES in step S78), the characteristic parameters are extracted from the effective image data (S80). After the characteristic parameters are extracted, the extracted parameters are used to determine whether the collected fingerprint matches with a fingerprint registered in the memory 26 (S82). That is, one of the characteristic parameters registered in the memory corresponding to the ID code input in step S72 is specified. A determination is made according to whether the characteristic parameters extracted in step S80 match the specified characteristic parameters. When registration was performed using characteristic parameters extracted from the image data having limited fingerprint ridgeline information, the condition of determining a match in the characteristic parameters is relaxed if the password input in step S72 matches. Consequently, even if only limited fingerprint ridgeline information was contained in the collected fingerprint image, and registration was made without sufficient extraction of characteristic parameters, it becomes easier to make a determination that the characteristic parameters match (i.e., it is the same fingerprint).

Then, when the extracted characteristic parameter matches the registered characteristic parameter, a door is opened (S86). When they do not match, a buzzer will be turned ON, and entry will be refused (S84).

The fingerprint verification device, which was described above in detail, is more effective than the conventional devices in the following aspects.

(A) According to the fingerprint verification device of this embodiment, the fingerprint image judgment portion 14 determines whether the collected image data contains sufficient fingerprint ridgeline information to enable identification of a person to be identified (effectiveness of the fingerprint image data). Then, fingerprint registration and fingerprint verification is performed based upon the image data determined to be effective by the fingerprint image judgment portion 14. Consequently, erroneous verification can be prevented, and fingerprint verification precision can be improved.

In particular, in the fingerprint verification device of this embodiment, the collected fingerprint images are separated into fingerprint images having limited fingerprint ridgeline information and fingerprint image having sufficient fingerprint ridgeline information, and registered separately with different contents. That is, when the fingerprint image contains sufficient fingerprint ridgeline information, normal fingerprint registration is performed. Moreover, when the fingerprint image contains limited fingerprint ridgeline information, fingerprint registration is performed using supplementary input information, such as a password.

Then, when a person, who is registered with a fingerprint image having limited fingerprint ridgeline information, makes a request for fingerprint verification, the condition of determining a match is relaxed by requiring that person to enter a password. In this manner, erroneous verification, in which an authorized, registered person is determined to be an unregistered person, can be prevented. In the fingerprint verification device of this embodiment, effective fingerprint image data are classified into two groups. Then, by performing different processes for registration and fingerprint verification of each group, verification of fingerprint images, which may be refused under normal conditions, is made possible.

(B) In the fingerprint verification device of this embodiment, the effectiveness of the fingerprint image data output from the A/D converter 12 is evaluated by calculating the image quality determining value using a simple process while giving consideration to the characteristics of the fingerprint image. The fingerprint images are not only evaluated using the ratio of the light and dark portions of the density, as in the past. Therefore, if the fingerprint ridgelines have collapsed, the fingerprint image is determined not to be an effective fingerprint image. Further, the characteristics of the fingerprint image can be evaluated without having to perform the time consuming process of obtaining the characteristic points from the fingerprint images, as in the past. Therefore, the amount of the image data that must be processed and the processing time can be reduced, and the fingerprint verification device can be constructed in a compact system.

In addition, the image quality judgment by the fingerprint verification device of this embodiment is performed based upon the difference of densities between the reference point and the comparison point, and the spectral characteristics. Therefore, even if the fingerprint image is collected using an optical system (including the light path separation type, total reflection type) or a non-optical system (semiconductor fingerprint reading chip), changes in the judgment algorithm are not required.

Furthermore, when the image quality determining value is calculated based upon the intensity or the rise and fall of the GDS, the processing (process to convert into GDS) that becomes necessary subsequently in the characteristic parameter extraction portion 16 is already performed. Therefore, the amount of calculations performed in the characteristic parameter extraction portion 16 can be reduced.

(C) In the fingerprint verification device of this embodiment, the calculation areas (reference point establishing pattern), which are used in the finger placement judgment process, image stability judgment process, and the image effectiveness judgment process performed by the fingerprint image judgment portion 14, are arranged in such a manner that they can be changed. Therefore, the amount of calculations can be optimized to match the application and purpose.

Next, the fingerprint verification device of the above described embodiment will be modified into another embodiment and will be explained as follow.

This fingerprint verification device is constructed in the same way as the above described fingerprint verification device. It comprises a fingerprint image capturer, an A/D converter, a fingerprint image judgment portion, a characteristic parameter extraction portion, a fingerprint registration portion, a fingerprint verification portion, a controller, and an input portion (refer to FIG. 1).

The fingerprint image verification device, which is described below, differs only in the following two aspects. In the first aspect, the fingerprint image capturer comprises a semiconductor fingerprint reader (fingerprint reading chip); in the second aspect, the method for determining the effectiveness of fingerprint image in the fingerprint image judgment section is modified. Therefore, only the parts that are different from the above described embodiment will be explained.

The fingerprint image capturer of this fingerprint image verification device collects the fingerprint image using a semiconductor fingerprint reader (fingerprint reading chip). The use of a semiconductor fingerprint reader to collect fingerprint images enables the fingerprint image capture portion to be made more compact. That is, a light path length is required in an optical system. However, a light path length is not required in a semiconductor fingerprint reader, thereby allowing the device to be made more compact. There are several different types of semiconductor fingerprint readers. One is an electrostatic capacitance type that collects a fingerprint based upon differences in electrostatic capacitance (differences in electrostatic capacitance between the fingerprint ridgeline portion and the fingerprint furrow line portion) when the finger contacts the fingerprint collection plate. Another is a heat detection type that collects a fingerprint image from differences in detected temperature, and another is an electric field intensity type that collects a fingerprint image based upon differences in electric field intensity. The electric field intensity type fingerprint reader (made by Osentech Phonetic Co. (FingerLoc2.1)) was utilized in this fingerprint verification device due to the clarity of the collected fingerprint image and its ease of operation.

Figure 27:
FIG. 27 shows a sandstorm-like fingerprint image, in which the fingerprint ridgeline is buried in noise.
Figure 27:

In this fingerprint verification device, because a semiconductor reader was utilized to collect fingerprint images, the effectiveness judgment of fingerprint image made in the fingerprint image judgment portion has been modified to perform an additional determination as to the amount of noise contained within the fingerprint image. That is, the semiconductor reader sometimes collects a fingerprint image of a fingerprint ridgeline buried in noise (a so-called "sandstorm image") as shown in FIG. 27. The judgment procedure described above will not be able to determine whether the fingerprint image is effective or not, based upon this type of fingerprint image. This is because noise could increase the difference between the density of the reference point and the density of the comparison point. Therefore, in this fingerprint image verification device, an additional process is added to evaluate whether the amount of noise contained within the fingerprint image is within an allowable range. The noise level determination process is performed after the following judgment processes: determination of whether the finger has started to be placed on the fingerprint image collection plate; image stability determination to determine whether the fingerprint image has stabilized; and determination as to whether sufficient fingerprint ridgeline information is contained within the fingerprint image data. These judgment processes are the same as those in the above described embodiment. The procedure for the noise level determination will be described as follows.

The noise level judgment by this fingerprint image verification device determines the amount of noise contained within the fingerprint image by utilizing the continuity of the fingerprint ridgeline in the fingerprint image. That is, because the fingerprint ridgeline is continuous, the density pattern (the high density portion of fingerprint ridgeline) in an established area disposed within the fingerprint image, and in an area shifted by a small amount (for instance 1 scan line) (hereafter called the comparison area) from the established area will be very similar in a clear fingerprint image. (This can also be seen from the similarity of the GDS pattern in the adjacent scan lines shown in FIGS. 16(a) and 16(b)) On the other hand, in a fingerprint image containing a large noise component, the density pattern will not be similar due to the effects of noise. Therefore, in this fingerprint image verification device, the amount of noise is evaluated by utilizing the above described characteristics. Fingerprint images that contain more than an allowable level of noise will be eliminated from the fingerprint images that are used in the fingerprint registration and verification. The procedures for determining the noise level will be described in detail as follows. In this fingerprint image verification device, the following four determination methods are used after making appropriate selection. (1) A method for determining the amount of noise based upon the similarity of the GDS patterns. (2) A method for determining the amount of noise based upon the similarity of the density patterns. (3) A method for determining the amount of noise based upon the average GDS. (4) A method for determining the amount of noise based upon the continuity of the average fingerprint pitch. Each case will be explained separately as follows.

Figure 21:
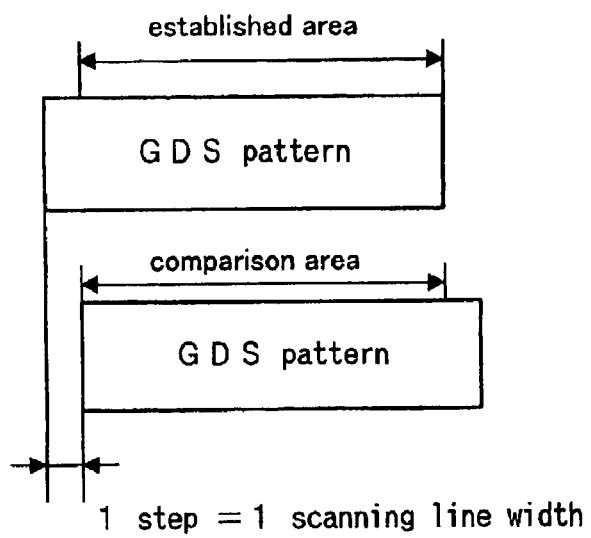
FIG. 21 shows a method for evaluating the amount of noise contained within the fingerprint image by calculating the similarity after shifting the GDS pattern.
Figure 22:
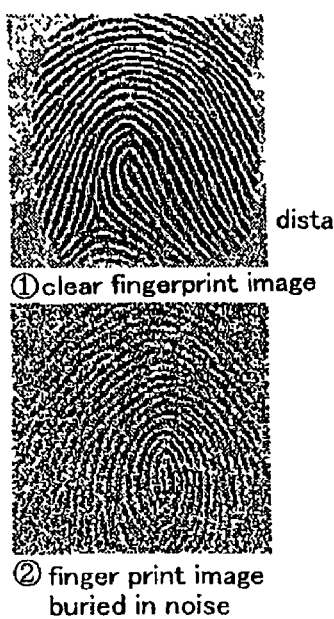
FIG. 22 shows the relationship between similarity and the width of shift in a clear fingerprint image and an obscure fingerprint image buried in noise.
Figure 22:
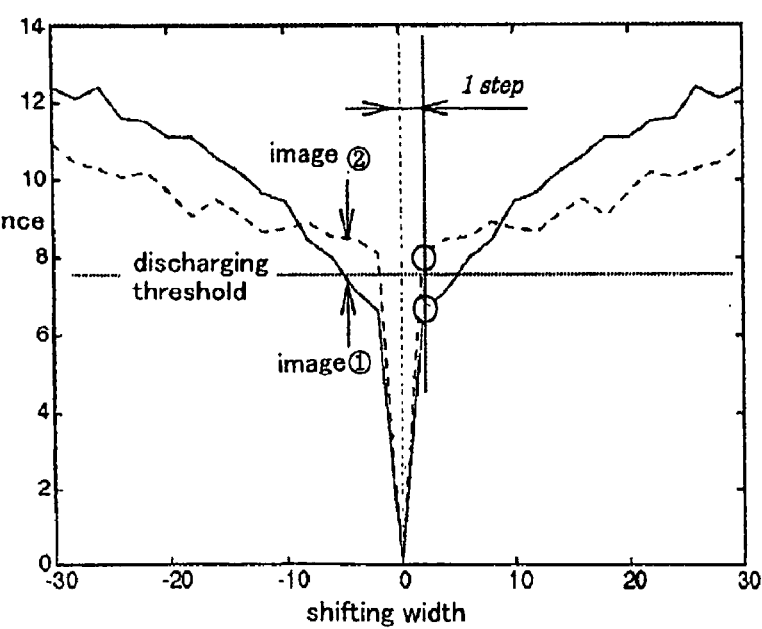

(1) Method for Determining the Amount of Noise Based Upon the Similarity of the GDS Patterns The method for determining the amount of noise contained within the fingerprint image based upon the similarity of the GDS patterns will be explained with reference to FIGS. 21 and 22. FIG. 21 shows a typical method for calculating the similarity of the GDS patterns. FIG. 22 shows the relationship between the similarity and the amount of shift between a clear fingerprint image and a fingerprint image buried in noise.

Figure 6:
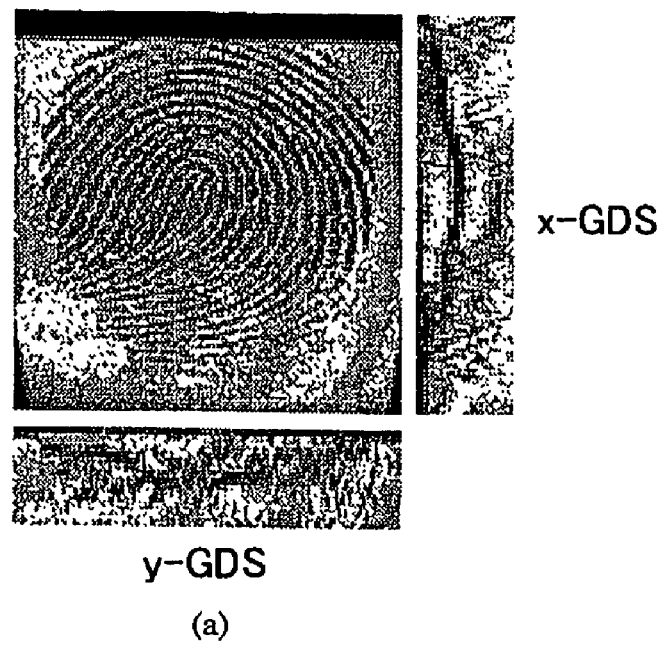
FIG. 6 is a chart showing density variation along the horizontal direction of a clear fingerprint image.
Figure 6:
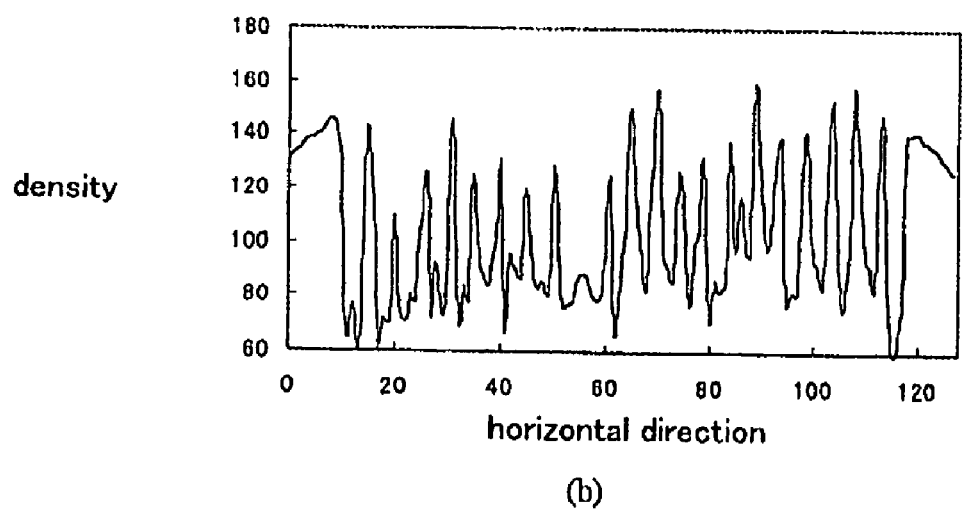
Figure 7:
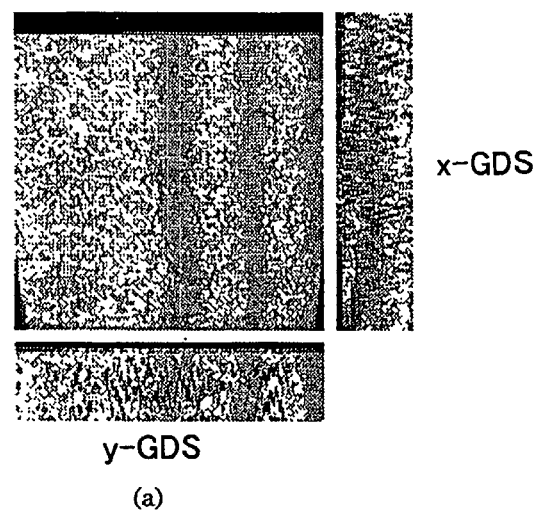
FIG. 7 is a chart showing density variation along the horizontal direction of an obscure fingerprint image.
Figure 7:
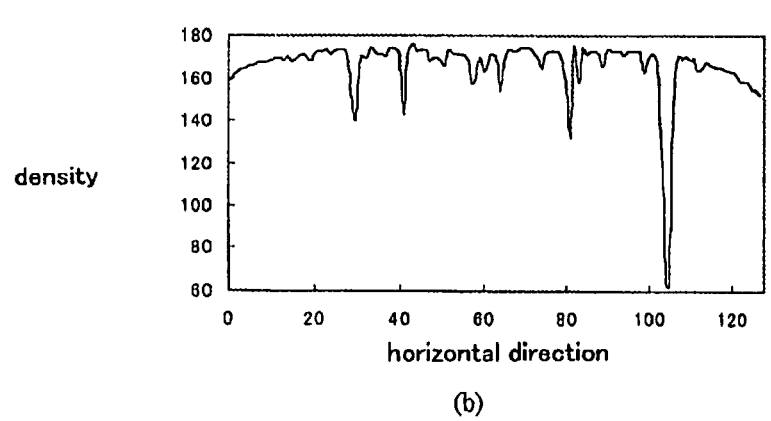

In this noise determination method, the GDS pattern of the entire fingerprint image is first extracted from the fingerprint image data. Specifically, the density waveform of all scanning lines in the x direction (or y direction) in the fingerprint image comprising n×m dots is frequency converted, and the GDS is obtained. The obtained values are plotted on a three-dimensional chart having the coordinates representing the scanning line n, frequency CH, and the GDS intensity GD, as shown in FIG. 17. This is the GDS pattern of the fingerprint image. The GDS pattern of the fingerprint image is given darkness and lightness to express the magnitude of GDS intensity in two dimensions. This is shown in the right side (GDS pattern in x direction), and in the bottom (GDS pattern in y direction) of the fingerprint images in FIGS. 6(a) and 7(a). The amount of data contained in these GDS patterns is made less than the amount of data contained within the fingerprint image data, by the given frequency conversion process. Consequently, the processing time can be shortened while still evaluating the entire fingerprint image.

After the GDS pattern is calculated in this manner, the similarity is calculated between the obtained GDS pattern (i.e., the GDS pattern of the y direction in the figure) and the GDS pattern shifted in the x direction by the width of 1 scanning line, as shown in FIG. 21. Specifically, the absolute value of the difference between the corresponding GDS intensities of the scanning line and the frequency channel is calculated (for example, the GDS intensity of the nth channel of i–1st scanning line corresponds with the GDS intensity of nth channel of i-th scanning line). The absolute value is obtained for all corresponding GDS intensities. The sum of absolute values obtained in this manner will be the judgment value. Then, if the calculated judgment value is less than a predetermined threshold value, i.e., when the GDS patterns of adjacent scanning lines are similar, the amount of noise contained within the fingerprint image is determined to be within the allowable range. Then, fingerprint registration and fingerprint verification will be performed. On the other hand, when the judgment value is greater than the predetermined threshold value, the amount of noise contained within the fingerprint image is determined to be greater than the allowable range. In that case, the fingerprint image is deleted from the fingerprint images used in the fingerprint registration and fingerprint verification.

A specific example of the application of this method will be described with reference to FIG. 22. On the left side of FIG. 22, two fingerprint images are shown: (1) a clear fingerprint image and (2) a fingerprint image buried in noise. The GDS patterns in both of these fingerprint images were shifted in the ± directions. The relationship between the width of shift and the judgment value is shown in the right side of FIG. 22, in which the width of the shift is shown on the abscissa, and the judgment value (distance) is shown on the ordinate. As clearly shown in the figure, when the GDS pattern is shifted by the width of 1 scanning line, (1) the judgment value of the clear fingerprint image decreases, and (2) the judgment value of the fingerprint image buried in noise increases. Therefore, by setting an appropriate threshold value, which is determined by experiment, and comparing this threshold value with the judgment value, a determination can be made as to it is a clear image having a small noise component.

As is clear from the above descriptions, the amount of noise component is evaluated in this method by providing an established area and a comparison area for the GDS pattern of the entire fingerprint image, as shown in FIG. 21. Then, the similarity between the established area and the comparison area is calculated to obtain the judgment value.

The GDS pattern in the y direction was used to determine the amount of noise component in the above explanation. However, of course, the determination of the amount of noise also can be performed using the GDS pattern in the x direction. Furthermore, the GDS patterns in both the x direction and the y direction can be used in this determination. In this case, the judgment values can be weighted for the x direction and y direction.

Additionally, it is understood that in the method of evaluating the similarity of the GDS pattern, various publicly available methods (mathematical methods) for calculating similarity (correlation) can be utilized.

Figure 23:
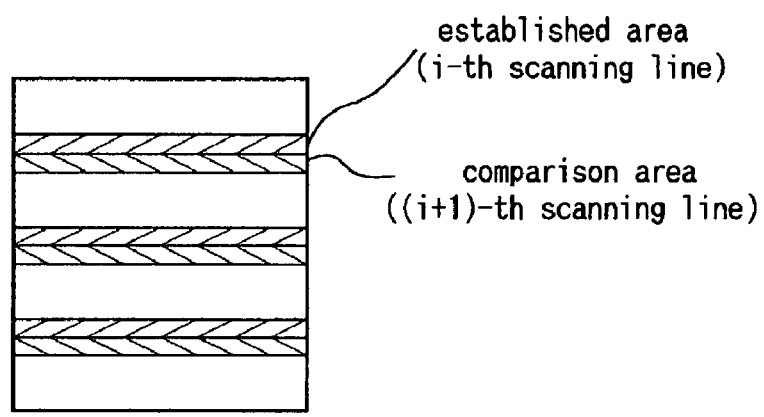
FIG. 23 shows a method for evaluating similarity within the areas from the density pattern of the comparison area and the established area provided within the fingerprint image.

(2) Method for Determining the Amount of Noise Based Upon Similarity in Densities Next, a method for determining the amount of noise based upon similarity in densities will be explained with reference to FIG. 23. FIG. 23 shows an illustration of a method for evaluating the similarity of the areas from the density patterns of the established area and the density patterns of the comparison area provided within the fingerprint image.

In this determination method, an established area is first defined by selecting a plurality of scanning lines in the horizontal direction (x direction) within the fingerprint image. Then, the scanning lines adjacent to these scanning lines are defined as the comparison area. Next, a sum is calculated from the absolute values of the difference in densities at the corresponding coordinates (x coordinate) in the established area and the corresponding comparison area. The sum of absolute values is obtained for the entire established area. Finally, the sum of absolute values obtained for each established area is defined as the judgment value for evaluating the amount of noise contained within the fingerprint image.

When two adjacent scanning lines are similar (i.e., when the noise component contained within the fingerprint image is low), the above described judgment value will decrease. When they are not similar (i.e., when the noise component contained within the fingerprint image is high), the judgment value will increase. Therefore, when the judgment value is less than a predetermined threshold value, the amount of noise contained within the fingerprint image is determined to be within the allowable range. Further, when the judgment value is greater than a predetermined threshold value, the amount of noise contained within the fingerprint image is determined to exceed the allowable range.

In this manner, the characteristic, in which the density patterns of two adjacent scanning lines are similar (fingerprint ridgeline is continuous), is also utilized to evaluate the amount of noise contained within the fingerprint image in this method (2).

In the example illustrated in FIG. 23, the established area (scanning lines) and the comparison area (scanning lines) were provided in the x direction. Naturally, the established area and the comparison area can also be provided in the y direction. Further, the method for determining the similarity between the corresponding areas can be any method as long as it is capable of evaluating the similarity between the two areas. For example, a correlation coefficient of the x direction (y direction) could be obtained.

(3) Method for Determining the Amount of Noise Using an Average GDS

Figure 24:
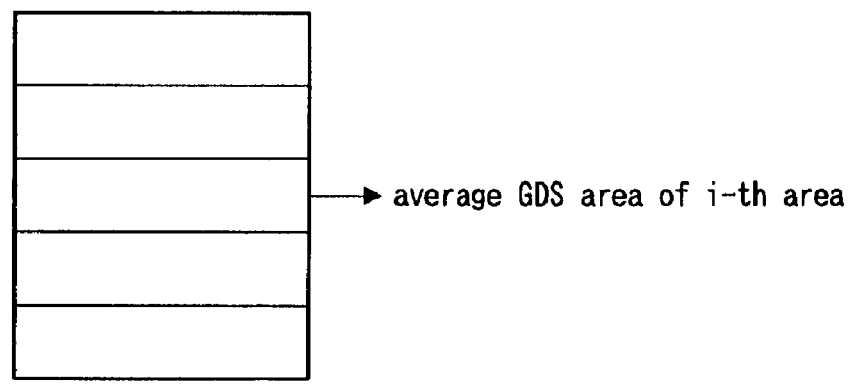
FIG. 24 shows a divided fingerprint image.

Next, a method for determining the amount of noise using an average GDS will be explained with reference to FIG. 24. FIG. 24 shows a divided fingerprint image.

In this judgment method, the fingerprint image is first divided into a plurality of areas. The average GDS value is obtained for each divided area. Specifically, GDS is first obtained for each scanning line from the density waveform of the plurality of scanning lines comprising each divided area (refer to FIG. 16). Next, the obtained GDS for each scanning line that belongs to the same frequency channels are added together, and the average value of the GDS is obtained.

Then, the amount of noise contained in the area is determined based upon the size of the area of the average GDS (i.e., the area formed by the coordinate axis and GDS in FIG. 16). That is, as is clear from FIG. 16, in a clear fingerprint image having a small noise component (i.e., a fingerprint image with continuous fingerprint ridgelines), the GDS in adjacent scanning lines of the same frequency channels increases. All scanning lines composing the area will show this tendency, within a limited area (within a divided area). Therefore, in a clear fingerprint image, the peaks of the average GDS will become sharper, and their area will increase. On the other hand, in a fingerprint image containing a large amount of noise, the GDS of each scanning line tends to be similar to the GDS shown in FIG. 16, due to the presence of the noise component. Consequently, the peak of the average GDS decreases, and the area decreases. Therefore, it becomes possible to evaluate the amount of noise contained in the area based upon the size of the area of the average GDS that is obtained for each area.

Therefore, the amount of noise contained within the entire fingerprint image can be determined by the sum of the areas of the average GDSs that are obtained for each area. When the sum exceeds the predetermined threshold value, the amount of noise contained within the fingerprint image is determined to be within an allowable range; when it does not exceed the predetermined threshold value, the amount of noise contained within the fingerprint image is determined to exceed the allowable range.

In this manner, this method for evaluating the amount of noise using the average GDS also utilizes the characteristic, in which the density patterns (GDS) of adjacent scanning lines are similar in a clear fingerprint image, to determine the amount of noise contained within the fingerprint image. Therefore, in this method also, the similarity of the GDS patterns of adjacent scanning lines (that correspond to the established area and comparison area described in the claims of Patent) is obtained. Then, the amount of noise component is determined based upon this similarity. The similarity is determined by calculating the average GDS in the divided areas, and by calculating the area of the average GDS.

In the above described example shown in FIG. 24, boundary lines extending in the x direction divide the fingerprint image into a plurality of areas. However, the fingerprint image naturally also could be divided into a plurality of areas by boundary lines extending in the y direction.

Figure 25:
FIG. 25 shows the distribution of an average fingerprint pitch along the vertical and horizontal axes.
Figure 25:
Figure 26:
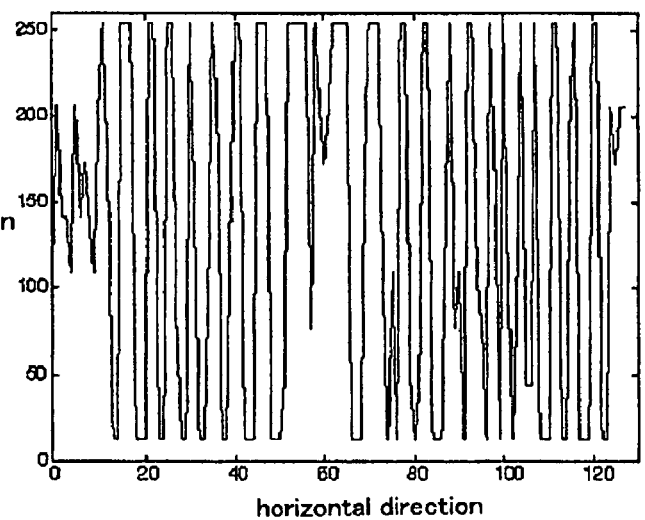
FIG. 26 shows a procedure for calculating the average fingerprint pitch from the fingerprint waveform.
Figure 26:
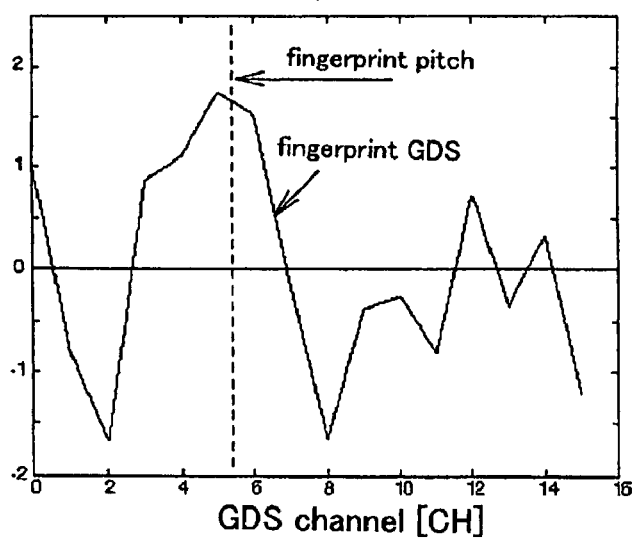

(4) Method for Determining the Amount of Noise Based Upon the Continuity of the Average Fingerprint Pitch Next, a method for determining the amount of noise based upon the continuity of the average fingerprint pitch will be explained as follows with reference to FIGS. 25 and 26. FIG. 25 shows a distribution of the average fingerprint pitch along the direction of abscissa and along the direction of ordinate. FIG. 26 shows methods for calculating the average fingerprint pitch from the fingerprint waveform.

In this judgment method, the value of the GDS (i.e., the waveform shown in the bottom of FIG. 26) is first obtained for each scanning line from the density waveform (i.e., the waveform shown in the top of FIG. 26) of all scanning lines extending in the horizontal direction (x direction) in the fingerprint image. Next, the average fingerprint pitch (fundamental frequency) is obtained from the calculated GDS. Specifically, an auto-correlation coefficient of the calculated GDS is calculated. The calculated auto-correlation coefficient is used to obtain a linear prediction coefficient. A normalized resonance frequency is obtained from the linear prediction coefficient. The normalized resonance frequency is a resonance frequency obtained by forced approximation of the GDS (spectrum of fingerprint waveform), which is obtained by frequency conversion of the fingerprint waveform, and is regarded as having a resonance characteristic with respect to one resonance point. It corresponds to the average intervals of the fingerprint ridgelines (dark part) on the scanning line, i.e., the average fingerprint pitch. After the average fingerprint pitch (normalized resonance frequency) on each scanning line is calculated using the above described steps, the amount of noise contained within the fingerprint image is determined based upon the calculated average fingerprint pitch.

The calculated average fingerprint pitch from the clear fingerprint image shown in FIG. 25(a) is shown on the right side (y direction) and bottom (x direction) of the fingerprint image shown in FIG. 25(b). In FIG. 25(b), the average fingerprint pitch is plotted for each position on the scanning line. As is clear from FIG. 25(b), the average fingerprint pitch obtained from a clear fingerprint image has a tendency to form one continuous curve. The reason for this is the average fingerprint pitch in adjacent scanning lines has nearly the same value due the characteristics of fingerprint ridgelines that run continuously. On the other hand, when noise is contained within the fingerprint image, the average fingerprint pitch will not run continuously due to the effects of noise; it will become discontinuous. Consequently, it becomes possible to determine the amount of noise contained within the fingerprint image by evaluating the continuity of the average fingerprint pitch.

In this embodiment, in order to evaluate the continuity of the average fingerprint pitch, the absolute values of the differences in the average fingerprint pitch of adjacent scanning lines are obtained for all scanning lines and then summed. The summed value is defined as the judgment value. This judgment value becomes a small value if the average fingerprint pitch is continuous, and becomes a large value if the average fingerprint pitch is not continuous. Therefore, when the calculated judgment value is less than a predetermined threshold value, the amount of noise contained within the fingerprint image can be determined to be within the allowable range Further, when the calculated judgment value is greater than the predetermined threshold value, the amount of noise contained within the fingerprint image can be determined to exceed the allowable range.

In a method for determining the amount of noise using the average fingerprint pitch, the amount of noise contained within the fingerprint image is determined by utilizing the characteristic, in which the density pattern (average fingerprint pitch) of adjacent scanning lines are nearly the same in a clear fingerprint image. Therefore, the similarity is obtained between the adjacent scanning lines (corresponds with the established area and comparison area described in the claims of Patent), and the amount of noise is determined based upon this similarity.

As is clear from FIG. 25(b), the characteristics shown by the average fingerprint pitch of a clear fingerprint images are the same for both the x direction and the y direction. Consequently, the above described judgment amount may be calculated based upon the average fingerprint pitch of the x direction and the y direction. The amount of noise contained within the fingerprint image may be determined based upon these judgment quantities.

After any one of the above described methods (1)–(4) is used to determine the amount of noise contained within the fingerprint image, only fingerprint images that are determined to contain an amount of noise within the allowable range will be used to perform the subsequent fingerprint registration and fingerprint verification.

As is clear from the above description, in this fingerprint verification device, only fingerprint images that are determined to contain an amount of noise that is within an allowable range will be used to perform fingerprint registration and fingerprint verification. Consequently, in this fingerprint image verification device, incorrect verifications can be prevented, and fingerprint verification precision can be improved.

The preferred embodiments of the present invention have been explained in detail. However, these are only examples. The present invention can be embodied in a variety of improved configurations that include a multitude of changes and improvements based upon the knowledge and skill in the art.

The invention claimed is:

1. A method for evaluating a fingerprint image, comprising the steps of:
   obtaining a density pattern of an established straight line provided within a fingerprint image;
   obtaining a density pattern of a comparison straight line provided by shifting the established straight line in a direction parallel to the established straight line and by predetermined distance;
   calculating a similarity between the two density patterns obtained in said processing steps; and
   evaluating the amount of noise contained within the fingerprint image based upon the amount of the similarity calculated in said calculation step.

2. A method as in claim 1, wherein the similarity of the density pattern of each straight line is evaluated by the similarity between a waveform signal composed of the density pattern on the established straight line and a waveform signal composed of the density pattern on the comparison straight line.

3. A method as in claim 2, wherein the similarity calculating step comprises the step of obtaining one dimensional spectral characteristics by frequency converting the waveform signal and calculating the similarity between the spectral characteristics of the two corresponding waveform signals.

4. A method as in claim 3, wherein the established straight line extends along an x or y direction, and the comparison straight line is provided by shifting the established straight line by a width of one scanning line.

5. A method as in claim 4, wherein the spectral characteristic is a group delay spectral (GDS).

6. A method as in claim 2, wherein the similarity calculating step comprises the step of obtaining an average pitch from said waveform signal, and calculating the similarity based upon a difference between the average pitches of the two corresponding waveform signals.

7. A method as in claim 6, wherein a plurality of established straight lines are provided within the fingerprint image and a comparison straight line is provided in correspondence to each straight line, and the evaluating step comprises the steps of calculating the evaluation value for each established straight line based upon a difference between the average pitches of the two corresponding waveform signals, and evaluating the amount of noise contained within the fingerprint image based upon the calculated evaluation value of each established straight line.

8. A method as in claim 7, wherein the average pitch is obtained by using an autocorrelation function.

9. A method as in claim 8, wherein the average pitch is obtained by using linear prediction analysis.

10. A fingerprint verification device, comprising:
    means for collecting a fingerprint and outputting a fingerprint image;
    means for obtaining an established straight line density pattern from the fingerprint image collected by the fingerprint image collecting means, the density pattern of one or a plurality of established straight lines being provided within the fingerprint image;
    means for obtaining a comparison straight line density pattern from the fingerprint image collected by the fingerprint image collecting means, the density pattern of the comparison straight line provided within the fingerprint image corresponding to each established straight line, and being shifted away from said established straight line by a predetermined distance in a direction parallel to the established straight line;
    means for calculating a similarity between two corresponding density patterns obtained by the respective density pattern obtaining means;
    means for evaluating the amount of noise contained within the fingerprint image based upon the similarity calculated by the similarity calculating means; and
    means for registering the fingerprint and/or verifying the fingerprint using the fingerprint image when the noise evaluation means determines that the fingerprint image contains less than a predetermined amount of noise.

11. A fingerprint verification device as in claim 10, wherein the calculating means calculates the similarity of the density pattern of each straight line based upon a similarity between a waveform signal composed of the density pattern on the established straight line and a waveform signal composed of the density pattern on the comparison straight line.

12. A fingerprint verification device as in claim 11, wherein the calculating means obtains one dimensional spectral characteristics by frequency converting the waveform signal and calculates a similarity between the spectral characteristics of the two corresponding waveform signals.

13. A fingerprint verification device as in claim 12, wherein the established straight line extends along an x or y direction, and the comparison straight line is provided by shifting the established straight line by the width of one scanning line.

14. A fingerprint verification device as in claim 13, wherein the spectral characteristic is a group delay spectral (GDS).

15. A fingerprint verification device as in claim 11, wherein the calculating means obtains an average pitch from said waveform signal, and calculates the similarity based upon a difference between the average pitches of the two corresponding waveform signals.

16. A fingerprint verification device as in claim 15, wherein a plurality of established straight lines are provided within the fingerprint image and a comparison straight line is provided in correspondence to each straight line, and the evaluating means calculates an evaluation value for each established straight line based upon a difference between the average pitches of the two corresponding waveform signals, and evaluates the amount of noise contained within the fingerprint image based upon the calculated evaluation value of each established straight line.

17. A fingerprint verification device as in claim 16, wherein the calculating means obtains the average pitch by using an autocorrelation function.

18. A fingerprint verification device as in claim 17, wherein the calculating means obtains the average pitch by using linear prediction analysis.

* * * * *

UNITED STATES PATENT AND TRADEMARK OFFICE
CERTIFICATE OF CORRECTION

| | | |
|---|---|---|
| PATENT NO. | : 7,079,672 B2 | Page 1 of 1 |
| APPLICATION NO. | : 09/937623 | |
| DATED | : July 18, 2006 | |
| INVENTOR(S) | : Noriyuki Matsumoto and Hideyo Takeuchi | |

It is certified that error appears in the above-identified patent and that said Letters Patent is hereby corrected as shown below:

On Title Page, Item (54),
    Title, replace "FINGERPRINT IMAGE EVALUATING METHOD AND FINGERPRINT MATCHING DEVICE" with --FINGERPRINT IMAGE EVALUATION METHOD AND FINGERPRINT VERIFICATION DEVICE--.

Signed and Sealed this

Twelfth Day of December, 2006

JON W. DUDAS
*Director of the United States Patent and Trademark Office*